(12) United States Patent
Faulhaber et al.

(10) Patent No.: US 12,008,390 B1
(45) Date of Patent: Jun. 11, 2024

(54) PERSISTENT EXECUTION ENVIRONMENT

(71) Applicant: Amazon Technologies, Inc., Seattle, WA (US)

(72) Inventors: Thomas Albert Faulhaber, Seattle, WA (US); Jonathan Esterhazy, Alameda, CA (US); Vladimir Zhukov, Seattle, WA (US); Stefano Stefani, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 170 days.

(21) Appl. No.: 16/699,488

(22) Filed: Nov. 29, 2019

(51) Int. Cl.
*G06F 9/455* (2018.01)
*G06F 9/54* (2006.01)

(52) U.S. Cl.
CPC ............ *G06F 9/45558* (2013.01); *G06F 9/54* (2013.01); *G06F 2009/45562* (2013.01); *G06F 2009/45591* (2013.01)

(58) Field of Classification Search
None
See application file for complete search history.

(56) References Cited

U.S. PATENT DOCUMENTS

| 6,096,094 | A | 8/2000 | Kay et al. |
|---|---|---|---|
| 8,335,851 | B1 | 12/2012 | Vendrow |
| 9,178,868 | B1 | 11/2015 | Leung |
| 9,350,682 | B1 | 5/2016 | Gupta et al. |
| 9,524,111 | B1 | 12/2016 | Manden et al. |
| 9,535,754 | B1 | 1/2017 | Suarez et al. |
| 9,959,157 | B1 | 5/2018 | Adogla et al. |
| 10,037,424 | B1* | 7/2018 | Guenther .................. G06F 9/50 |
| 10,055,311 | B1 | 8/2018 | Troyan et al. |
| 10,333,789 | B1 | 6/2019 | Dippenaar et al. |
| 10,587,471 | B1 | 3/2020 | Bramhill et al. |
| 10,592,493 | B1 | 3/2020 | Sutherland et al. |
| 10,672,251 | B1 | 6/2020 | Krayer |
| 10,735,281 | B1 | 8/2020 | Burgin et al. |
| 10,826,723 | B1 | 11/2020 | Strauss et al. |
| 11,113,120 | B1 | 9/2021 | Greenfield et al. |
| 11,438,231 | B2* | 9/2022 | Gardner .............. H04L 41/0876 |

(Continued)

OTHER PUBLICATIONS

U.S. Appl. No. 16/699,489, filed Nov. 29, 2019, Thomas Albert Faulhaber et al.

*Primary Examiner* — Lewis A Bullock, Jr.
*Assistant Examiner* — Melissa A Headly
(74) *Attorney, Agent, or Firm* — Robert C. Kowert; Kowert, Hood, Munyon, Rankin & Goetzel, P.C.

(57) ABSTRACT

Methods and apparatus for providing persistent execution environments for computation systems including but not limited to interactive computation systems. A service is provided that extends the notion of static containers to dynamically changing execution environments into which users can install code, add files, etc. The execution environments are monitored, and changes to an execution environment are automatically persisted to environment versions(s) so that code run in the execution environment can be run later or elsewhere simply by referring to the environment. There is no explicit build step for the user. Instead, incremental changes are added to environment versions which are stored and are ready to be used to instantiate respective execution environments on other compute instances.

17 Claims, 33 Drawing Sheets

(56) References Cited

U.S. PATENT DOCUMENTS

| | | |
|---|---|---|
| 2003/0229522 A1 | 12/2003 | Thompson |
| 2005/0125677 A1 | 6/2005 | Michaelides |
| 2005/0177750 A1 | 8/2005 | Gasparini |
| 2007/0136579 A1 | 6/2007 | Levy |
| 2009/0113423 A1 | 4/2009 | Hiltgen et al. |
| 2010/0211658 A1 | 8/2010 | Hoogerwerf et al. |
| 2010/0262652 A1 | 10/2010 | Soga |
| 2011/0119601 A1 | 5/2011 | Knothe et al. |
| 2011/0138055 A1 | 6/2011 | Daly et al. |
| 2012/0029817 A1 | 2/2012 | Khorashadi et al. |
| 2013/0152038 A1 | 6/2013 | Lim et al. |
| 2013/0212191 A1 | 8/2013 | Suraj et al. |
| 2013/0238695 A1 | 9/2013 | Giraud et al. |
| 2015/0039682 A1 | 2/2015 | Chasman |
| 2015/0100615 A1 | 4/2015 | Irani |
| 2016/0071023 A1 | 3/2016 | Eicher et al. |
| 2017/0171022 A1* | 6/2017 | Hamer ............... H04L 41/0866 |
| 2017/0250951 A1 | 8/2017 | Wang et al. |
| 2017/0288295 A1 | 10/2017 | Sultenfuss et al. |
| 2018/0077244 A1 | 3/2018 | Thakkar |
| 2018/0121559 A1 | 5/2018 | Bare |
| 2018/0152417 A1 | 5/2018 | Jain et al. |
| 2018/0322455 A1 | 11/2018 | Sebastian et al. |
| 2018/0336027 A1 | 11/2018 | Narayanan |
| 2019/0069124 A1 | 2/2019 | Labrecque et al. |
| 2019/0149480 A1 | 5/2019 | Singhvi et al. |
| 2019/0163460 A1* | 5/2019 | Kludy ................... H04L 9/3263 |
| 2019/0197789 A1 | 6/2019 | Macauley |
| 2019/0220211 A1 | 7/2019 | Wang |
| 2019/0306723 A1 | 10/2019 | Hmimy |
| 2019/0354389 A1* | 11/2019 | Du ....................... G06F 9/45545 |
| 2020/0050787 A1 | 2/2020 | Mahalle et al. |
| 2020/0073649 A1 | 3/2020 | Viana |
| 2020/0099772 A1 | 3/2020 | Ray |
| 2020/0133982 A1 | 4/2020 | Thangesaran |
| 2020/0143583 A1 | 5/2020 | Jiang et al. |
| 2020/0151279 A1 | 5/2020 | Haberstroh |
| 2020/0159525 A1 | 5/2020 | Bhalla |
| 2020/0167094 A1 | 5/2020 | Sariel et al. |
| 2020/0233648 A1 | 7/2020 | Bonas |
| 2020/0274758 A1 | 8/2020 | Sudhakaran et al. |
| 2021/0099517 A1 | 4/2021 | Friedrich et al. |

* cited by examiner

PERSISTENT EXECUTION ENVIRONMENT

BACKGROUND

Many companies and other organizations operate computer networks that interconnect numerous computer systems to support their operations, such as with the computer systems being co-located (e.g., as part of a local network) or instead located in multiple distinct geographical locations (e.g., connected via one or more private or public intermediate networks). For example, data centers housing significant numbers of interconnected computer systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

Container technology is a virtualization technology that allows applications to be developed as containers that can be deployed to and executed in container-based virtualization environments provided by container platforms on host machines, for example host devices on a network. A container is a stand-alone executable package that executes in a container-based virtualization environment on a host machine and that includes resources needed to execute an application in the container-based virtualization environment: e.g., code, runtime, system tools, system libraries, and settings. A container platform virtualizes an operating system (OS) in order for multiple workloads (containers) to run on a single OS instance. An example container platform is the Docker container platform.

A "notebook" environment is a web-based interactive computational environment for creating notebook documents. A notebook document is, for example, a JSON document based on a versioned schema and contains an ordered list of input/output cells which can contain executable code (e.g., in Python, Julia, R, Haskell or other programming languages), text, mathematics, graphics, and rich media. An example notebook environment is the Jupyter Notebook environment. In a notebook environment such as Jupyter, a kernel is a program responsible for handling various types of requests (code execution, code completions, inspection, etc.), and providing replies. An example kernel is an iPythyon kernel; however, kernels for various other programming languages may be provided.

Figure 1:
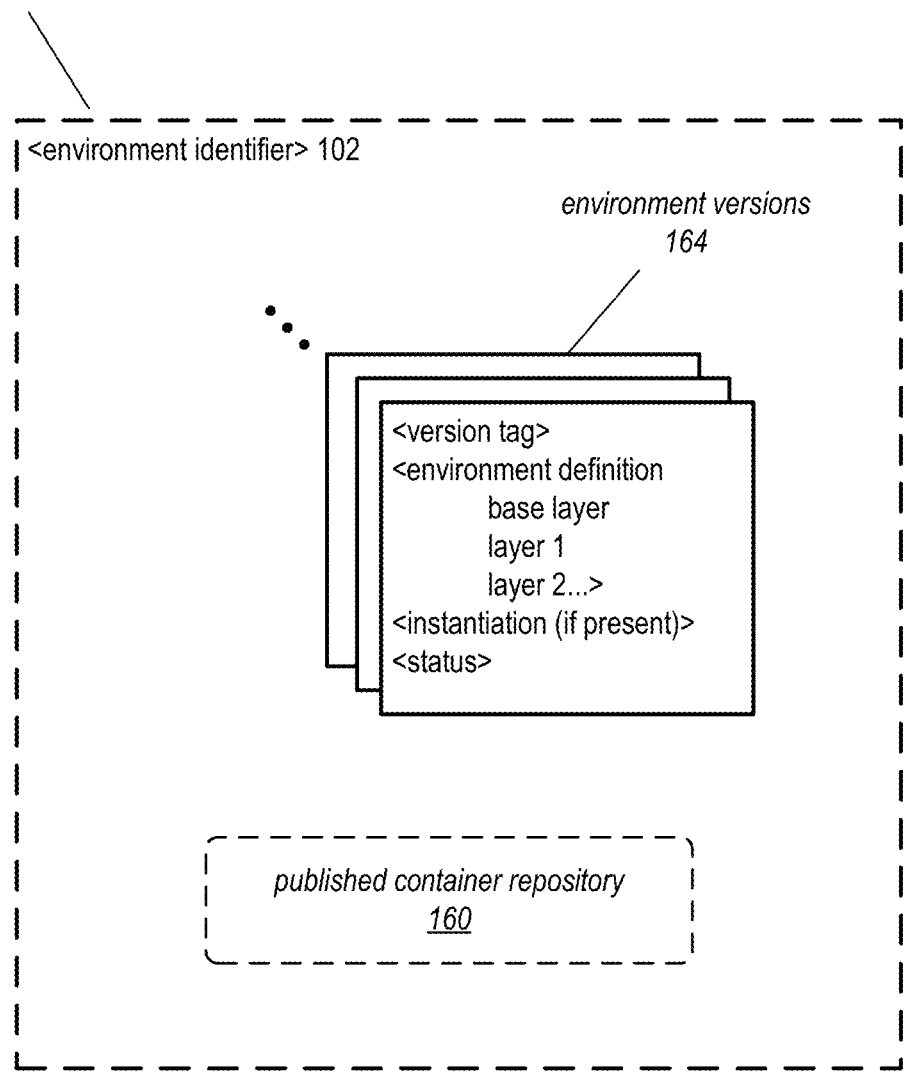
FIG. 1 graphically illustrates an environment, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Embodiments of persistent execution environments are described. Embodiments of a computation service are described that may provide persistent execution environments for computation systems including but not limited to web-based interactive computation environments (e.g., Jupyter Notebook environments). Embodiments may provide cloud-based execution environments to users without requiring the users to build containers and configure compute instances for their cloud-based backend systems. Embodiments may extend the notion of static containers (e.g., Docker containers) to dynamically changing execution environments into which users (e.g., programmers and data scientists) can write, install, and execute code (e.g., Python code), add files, etc. The execution environments are monitored, and changes to an execution environment are automatically persisted to environment versions so that code run in the environment can be run later or elsewhere (e.g., by the same or another user) simply by referring to the environment name. This differs from conventional container architectures for at least the reason that there is no explicit build step for the user. Instead, incremental changes are added to environment versions which are stored and are ready to be used to instantiate respective execution environments on other compute instances in the cloud.

Container technology is a virtualization technology that allows applications to be developed as containers that can be deployed to and executed in container-based virtualization environments provided by container platforms on host machines, for example host devices in a provider network as illustrated in FIGS. 8 through 11. A container is a stand-alone executable package that executes in a container-based virtualization environment on a host machine and that includes resources needed to execute an application in the container-based virtualization environment: e.g., code, runtime, system tools, system libraries, and settings. A container platform virtualizes an operating system (OS) in order for multiple workloads (containers) to run on a single OS instance. An example container platform that may be used in embodiments is the Docker container platform. Note, however, that other container platforms may be used in embodiments.

Embodiments of the computation service may reduce the complexity of working with containers in computation systems, and may abstract the concept and complexity of "containers" from most users' experience. Instead of having to deal with building containers and provisioning compute instances on a provider network for their containers, users may work completely in code via an interface (e.g., a notebook interface), and the service creates containers and other artifacts automatically when necessary. Embodiments may help users create consistent and reproducible container-based execution environments for running their code across various services. Embodiments may significantly improve the performance of building and using containers by accelerating and short-circuiting the various steps in container construction and delivery. Embodiments may serve as a build and publish service to create container images in various repositories.

Embodiments of the methods and apparatus for persistent execution environments may, for example, be used in Embodiments of serverless computation environments with persistent storage as described herein.

Embodiments of serverless computation environments with persistent storage are also described. Embodiments of a service are described that may provide persistent execution environments for web-based applications, for example web-based applications with interactive programming environment frontends (e.g., Jupyter Notebook environments). Embodiments may provide network environments for web-based applications to users without requiring the users to explicitly build execution environments (e.g., containers) and configure compute instances for their cloud-based backend systems. Each user of a web-based application may be provided with a persistent, user-specific context that includes, but is not limited to, a persistent file volume and configuration information for the user. When a user logs on to the web-based application, the service configures a network environment for the user according to the configuration information. Each user that logs on may be provided with their own network environment configured according to their respective context. A network environment includes one or more compute instances, with each compute instance implementing one or more execution environments (e.g. container-based execution environments) that are instantiated according to the user's context. Embodiments of serverless computation environments with persistent storage may, for example, leverage embodiments of the methods and apparatus for persistent execution environments as described herein to generate and store new environment versions that are stored to a user's context and that can be used to instantiate instances of the execution environments on compute instances.

In embodiments, a user's execution environments are monitored by the service, and changes to the execution environments (e.g., additions of layers on top of a base layer (e.g., a container) are automatically persisted to the user's context. Thus, if the user logs off and back on to the web-based application account, the user's network environment can be automatically re-instantiated based on the persisted information in the user's context. Compute instances for execution environments can be deallocated when idle to reduce cost for the user, and new compute instances can be allocated and provisioned with the execution environments based on the persisted context when needed. A user may select a different type of compute instance for an execution environment, and the service seamlessly deallocates the current compute instance and allocates and provisions a new compute instance of the required type for the user based on the user's context. In addition, a user may share an environment interface (e.g., a Jupyter notebook) to an execution environment (e.g., a container configured with one or more layers) with another user in their account, and both the environment interface and the execution environment may be made available to the other user via their web application interface without the other user having to obtain a compute instance and install a package to build and run the execution environment.

Embodiments of the serverless computation environment with persistent storage may, for example, be implemented in a provider network. A provider network may, for example, be a network set up by an entity such as a company or a public sector organization to provide one or more services accessible via the Internet (such as various types of cloud-based computing or storage) to a distributed set of clients or customers. A provider network may include one or more data centers hosting various resource pools, such as collections of physical and virtualized computer servers, storage devices, networking equipment and the like, needed to implement and distribute the services offered by the provider. An example provider network in which embodiments may be implemented is illustrated in FIGS. 16 through 19.

Persistent Execution Environments

Embodiments of persistent execution environments are described in reference to FIGS. 1 through 7.

Embodiments of a computation service are described that may be used to define, build, and publish environments for executing container-based applications. FIG. 1 graphically illustrates an environment, according to some embodiments. An environment 100 may include, but is not limited to:

A unique environment identifier 102.
A published container repository 160 (optional).
One or more environment versions 164.

Each environment version 164 may include, but is not limited to:

An environment definition that may be used to build the environment.
An instantiation that represents the built environment (if built).
A tag (optional) that may be used to reference the version. This may also be the container (e.g. Docker) tag if this version is published.
A status (e.g., one of Defined, Building, Built, Build Failed, Publishing, Published, or Publish Failed).

An environment definition is a list of environment layers. Each layer may be one of the following:

A reference to another environment. This may be the first layer in the definition, and selects a base image for the environment.
A reference to a container image (e.g., a Docker image) in a repository. This may be the first layer in the definition, and selects a base image for the environment.
A reference to a layer object in network-based storage. The layer object may, for example, be a compressed tar that represents an Open Containers Initiative (OCI) layer. The layer object may be the base layer, or may be applied on top of other layers.
A reference to a source definition in network-based storage.
A URL to a public git repository to use as a source definition.
The name of a defined git repository (which can include login information) to use as a source definition.
A JSON block which contains a source definition.
An expiration date (optional). The expiration date may be used by the computation service to delete resources associated with the version and delete the version.

A source definition is a group of files that describes the contents of a layer, for example using standardized dependency definitions like "requirements.txt", as well as literal files to be included. When retrieved from storage, this may be a compressed tar file. When encoded as JSON, the JSON format may effectively embed the files in the structure. At build time, the service extracts the embedded files to run the operations.

A layer in an environment definition may correspond to one or more layers in the output environment instantiation (referred to herein as an execution environment). An environment definition may be a list of layers that corresponds to the built container image (the execution environment). The first layer may be a pointer to a base container image, and the other layers may be pointers to, for example, layers in network-based storage as tarballs. A "tarball" is a computer file format that combines and compresses multiple files. To build an execution environment, at least a base layer (e.g., a container image) and in at least some cases one or more additional layers may be pulled from storage (e.g., by a host agent executing on a compute instance on a host device in a provider network) and assembled (e.g., on the compute instance).

Embodiments of the computation service may include components and APIs that provide one or more of, but not limited to:

Functionality to turn a running container-based execution environment into an environment specification.
Functionality to define execution environments and build and publish container images (both "frozen" and "slushy") based on the execution environments.
Functionality to pull container images (both "frozen" and "slushy") onto compute instances to be run that is faster than conventional container pull technology.

Embodiments of the computation service may be used to quickly construct container images that may need to live for only a short time. To support this, embodiments may differentiate between "frozen" images and "slushy" images. A frozen image is a standard container (e.g., Docker) image stored in a container repository. A slushy image is an image that typically (but not necessarily) has a frozen image as its base, but has other explicitly referenced layers as part of its construction. These layers may be stored as tarballs by a network-based storage service, or alternatively may refer to objects on a local file system.

A code reference is a pointer to raw code and dependency definitions, for example in a git repository or stored as a tarball. A code reference may be used to construct one or more container layers. Dependency definitions may use standard tools (e.g., requirements.txt for Python/pip) to define packages and other dependencies to be added to a container image.

Embodiments of the persistent execution environment for container-based applications may, for example, be implemented in a provider network. A provider network may, for example, be a network set up by an entity such as a company or a public sector organization to provide one or more services accessible via the Internet (such as various types of cloud-based computing or storage) to a distributed set of clients or customers. A provider network may include one or more data centers hosting various resource pools, such as collections of physical and virtualized computer servers, storage devices, networking equipment and the like, needed to implement and distribute the services offered by the provider. An example provider network in which embodiments may be implemented is illustrated in FIGS. 8 through 11.

Figure 2:
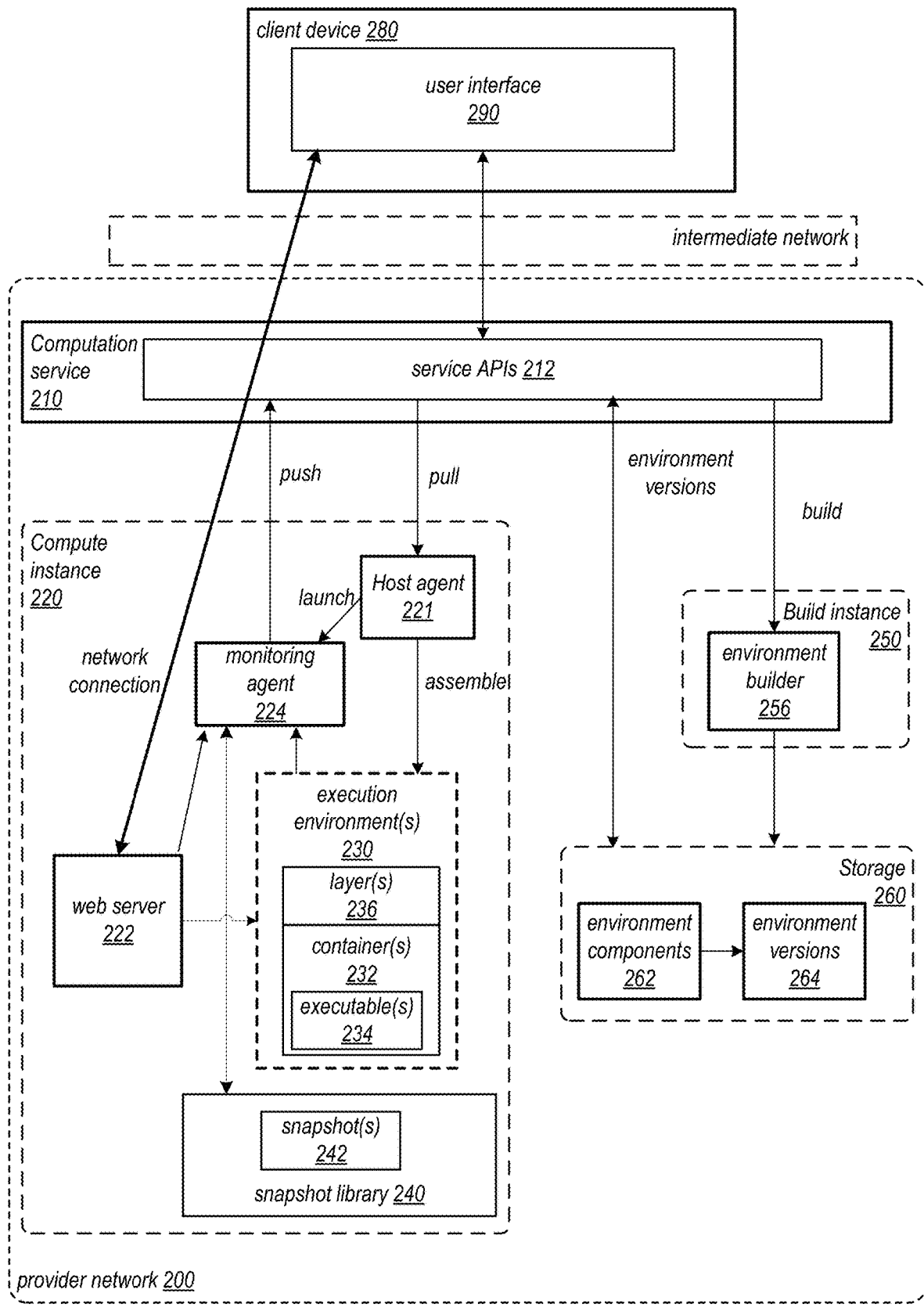
FIG. 2 illustrates persisting execution environments on a provider network, according to some embodiments.
Figure 3:
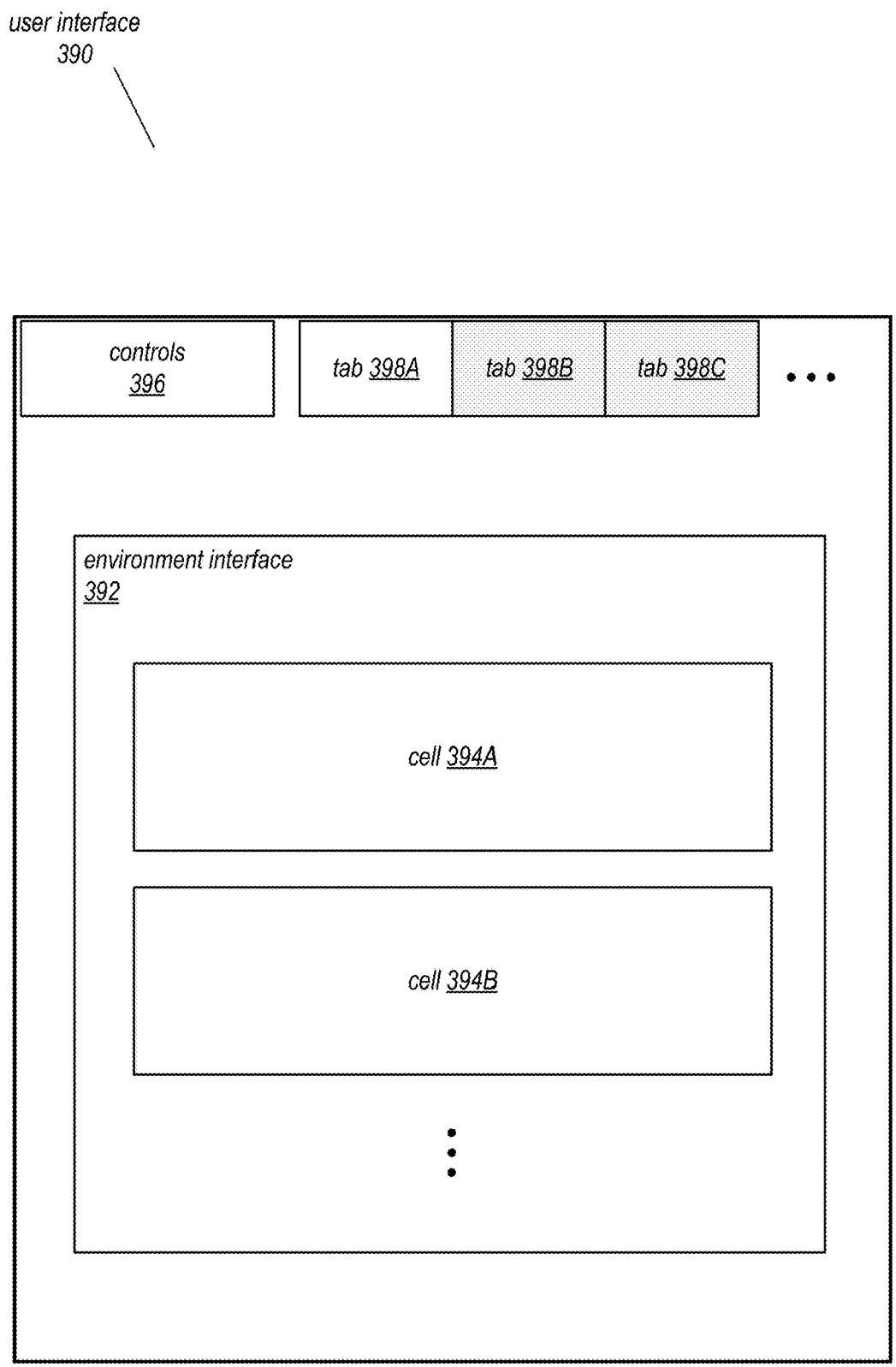
FIG. 3 illustrates an example user interface to execution environments on compute instances, according to some embodiments.

FIG. 2 illustrates persisting execution environments on a provider network, according to some embodiments. A computation service 210 may be provided on a provider network 200. The computation service 210 may provide one or more APIs 212. A user may access the service 210 on provider network 200 via a user interface 290 to a web-based application (e.g., displayed in a browser program) on a client device 280. An example user interface that may be used in some embodiments is illustrated in FIG. 3. A client device 280 may, for example, be a desktop computer, a laptop/notebook computer, a tablet or pad device, a smartphone, or in general any device that is capable of providing a user interface 290 and connecting to the service 210 over an intermediate network such as the Internet.

The user may access an environment via the user interface 290. For example, the user may access the service 210 using the user interface 290 to log on to an account for a web-based application. In response, an execution environment 230 for the indicated environment may be instantiated on a compute instance 220 on the provider network 200. In some embodiments, an execution environment may include a base layer (e.g., a container 232) and one or more layers 236 on top of the container 232. Container technology is a virtualization technology that allows applications to be developed as containers that can be deployed to and executed in container-based virtualization environments provided by container platforms on host machines, for example host devices in a provider network as illustrated in FIGS. 8 through 11. A container is a stand-alone executable package that executes in a container-based virtualization environment on a host machine and that includes resources needed to execute an application in the container-based virtualization environment: e.g., code, runtime, system tools, system libraries, and settings. A container platform virtualizes an operating system (OS) in order for multiple workloads (containers) to run on a single OS instance. An example container platform that may be used in embodiments is the Docker container platform. Note, however, that other container platforms may be used in embodiments. A container 232 may implement one or more executables 234 (e.g., code, programs, etc.). In a notebook environment such as the Jupyter notebook environment, an executable 234 may be a "kernel", and the user interface 290 may provide a notebook document, for example as illustrated in FIG. 3. A kernel is a program responsible for handling various types of requests (code execution, code completions, inspection, etc.) input via one or more cells in a notebook document, and for providing replies via the user interface. An example kernel is an iPythyon kernel; however, kernels for various other programming languages may be provided.

In some embodiments, to instantiate an execution environment 230 on a compute instance 220, the service 210 allocates a compute instance 220 for the environment. In some embodiments, if there are no compute instances already allocated to the user or if the service determines that the environment requires a new compute instance, then the service 210 may allocate a compute instance on the provider network 200 to the user for the environment, for example by calling a provider network 200 service that manages and provides compute instances on host devices on the provider network. Alternatively, if one or more compute instance are already allocated to the user, the service 210 may select one of the allocated compute instances.

Once the compute instance 220 is allocated, the service 210 may instantiate a host agent 221 and a web server 222 on the compute instance 220. In some embodiments, the web server 222 is instantiated in an execution environment, for example a container-based execution environment. In some embodiments, the web server 222 may be a web-based application. In some embodiments, the host agent 221 is launched on the compute instance 220 by the service 210, and the host agent 210 then builds and launches the web server 222 execution environment on the compute instance 220.

Once the web server 222 is instantiated, the computation service 210 facilitates establishing a network connection (e.g., an authenticated network pipe) from the user interface 290 on the client device 280, through the intermediate network, and over the provider network 200 network substrate to the web server 222 on the compute instance 220. In some embodiments, the computation service 210 may also facilitate connecting the compute instance 220 to one or more resources (e.g., other compute instances, virtual storage provided by a storage service, etc.) of the user on the provider network 200 and/or allocating resources to the user on the provider network 200 (e.g., allocating storage 260 for the user's environment components 262, environment versions 264, and/or notebook documents via one or more storage services of the provider network 200). In some embodiments, the user may have or be associated with a virtual network on the provider network 200 (see, e.g., FIG. 11), and the service 210 may facilitate connecting the compute instance 220 to the users' virtual network.

The host agent 221 may also build one or more initial execution environments 230 on the compute instance 220, each including one or more layers including a base layer (e.g., a container 232) and in some cases one or more additional layers 236, and launches a monitoring agent 240 on the compute instance 220. In some embodiments, to build an execution environment 230, the host agent 221 obtains an environment version 264 for the environment, for example as illustrated in FIGS. 1, from storage 260, and builds the execution environment 230 on the compute instance 220 according to the information in the obtained environment version 264, for example by pulling one or more components 262 of the execution environment 230 as indicated in the environment version 264 from storage 260 and assembling the components 262 on the compute instance 220 as indicated in the environment version 264.

The user may work on their execution environment(s) 230 on the compute instance 220 via the user interface 290. For example each execution environment 230 may be associated with a notebook document; the user may work in a notebook document to, for example, add, modify, and/or execute code 234 in the cell(s) of the notebook document. In some embodiments, the user's interactions with the user interface go through the network connection to the web server 222, which then forwards the interactions to the appropriate destination (e.g. to an execution environment 230). Results of the interactions, if any, may be returned to the user interface 290 by the server 222 through the network connection. For example, the user may execute code in an execution environment 230 via the user interface 290, and results of the execution may be returned to the user interface 290 for display.

In some embodiments, the user interface 290 may include "tabs" or other interface elements as illustrated in FIG. 3 via which the user may select execution environments 230 (e.g., tabs to open notebooks associated with particular execution environments 230). In some cases, if necessary, a new execution environment 230 may be built on the compute instance 220 by the host agent 221 in response to a user interaction with the user interface 290; for example, the user may select a tab or other interface element that invokes an environment that has not yet been instantiated. In some cases, if necessary, a new compute instance 220 may be allocated for the user in response to a user interaction with the user interface 290, and one or more execution environments 230 may be built by a host agent 221 on the new compute instance 220 and connected to the web server 222 (note that a web server is typically not launched on the new compute instance 220).

The monitoring agent 224 monitors the execution environment(s) 230 on the compute instance 220. The user may modify an execution environment 230 via the user interface 290, for example by adding one or more additional layers 236 on top of a container base layer 232, removing one or more layers 236, and/or modifying configuration of a layer. Upon detecting a change in an execution environment 230, a new environment version 264, for example as shown in FIG. 1, may be generated and stored in persistent storage 260 on the provider network 200. In some embodiments, the monitoring agent 224 generates snapshots 242 that include changes to the execution environment 230 and stores the snapshot(s) 242 to a snapshot library 240, for example in memory or storage of the compute instance 220. To generate and store a new environment versions 264 for the execution environment 230, the monitoring agent 224 provides a snapshot 242 to the computation service 210 according to an API 212. The computation service 210 then generates the new environment version 264 including the changes in the execution environment 230, and stores the new environment version 264 to storage 260 on the provider network 200, for example to a persistent context store for the respective user maintained by a storage service on the provider network 200.

In some embodiments, the monitoring agent 224 may not cause a new environment version 264 to be generated for each change in a respective execution environment 230. Instead, the monitoring agent 224 may capture a snapshot 242 of an execution environment 230 periodically; the snapshot 242 may include one or more changes to the execution environment 230, typically changes to a top layer of the execution environment 230. The snapshot 242, which may include more than one change, may then be provided to the computation service 210 which generates a new environment version 264 for the respective execution environment 230.

In some embodiments, the computation service 210 may provide functionality to the user via the user interface 290 and APIs 212 that allows the user to manage their persisted environment versions 264, for example that allow the user to select older environment versions 264 to be loaded and executed, to delete environment versions 264, to share environment versions 264 with other users, and so on. In some embodiments, an environment version 264 may include an optional expiration date/time at which an older environment version 264 may be automatically deleted or archived unless the user overrides the expiration.

In some embodiments, computation service 210 may receive execution environments as pre-built "packages" from one or more sources and store the execution environments to storage 260 on the provider network. For example, monitoring agent 224 may send an execution environment including a latest snapshot 242 to the service 210 via an API 212; the service 210 may then simply store the execution environment to storage 260. As another example, service 210 may receive an execution environment from an external source, for example from another service or from a user via an API 212, and store the received execution environment. The stored execution environments may, for example, be stored as environment components 262 that may be used as base layers for execution environments instantiated on compute instances 220.

However, computation service 210 may instead or also receive execution environment as descriptions from a compute instance 220, a user, or from some other source such as another service. In this case, an execution environment may need to be built from the description. The computation service 210 may thus include or access an environment builder 256 implemented on a build instance 250 on the provider network 200 to build the execution environment from the description. In some embodiments, an environment builder 256 may itself be implemented as or in an execution environment on a build instance 250. If there is no available environment builder 256/build instance 250 to build an execution environment from a received description, then the computation service 210 may allocate a build instance 250 and instantiate an environment builder 256 instance on the build instance 250. The environment builder 256 may then build and store an execution environment according to the description.

FIG. 3 illustrates an example user interface to execution environments on compute instances, according to some embodiments. A user interface 390 may, for example, be a web page that provides a notebook document (e.g., a Jupyter document) as an interface 392 to an execution environment on a compute instance. A notebook environment is a web-based interactive computational environment for creating notebook documents. A notebook document is, for example, a JSON document based on a versioned schema and contains an ordered list of input/output cells 394 which can contain executable code (e.g., in Python, Julia, R, Haskell or other programming languages), text, mathematics, graphics, and rich media. An example notebook environment is the Jupyter Notebook environment. In a notebook environment such as Jupyter, a kernel is a program responsible for handling various types of requests (code execution, code completions, inspection, etc.) input via the cells 394, and for providing replies via the cells 394. An example kernel is an iPythyon kernel; however, kernels for various other programming languages may be provided. In embodiments, the kernels are implemented in containers packaged in execution environments on compute instances, for example as illustrated in FIG. 2. The user interface 390 may also provide one or more controls 396 for interactions with the computation service via an API to the service. Example interaction may include, but are not limited to, logging on to a web-based application, managing versions of an execution environment, and viewing and modifying settings for the user's account. The user interface may also include one or more tabs 398, for example tabs for selecting different execution environments and respective environment interfaces 392 via a web server on a compute instance.

In a notebook environment, notebook documents may be stored for a user in a persistent file volume on the provider network. The user works on the notebook document via the environment interface 392 displayed on user interface 390 (e.g., in a web browser), for example entering or modifying code in the cell(s) 394. Amendments to the code are written to the notebook document in the persistent file volume. The user may execute one or more cells 394 in the notebook document; when executed, the code may be sent to a kernel in a respective execution environment on a compute instance for execution; results of the execution may be written to the notebook document in the persistent file volume, and returned to the environment interface 392 for display in a respective cell 394.

Figure 4:
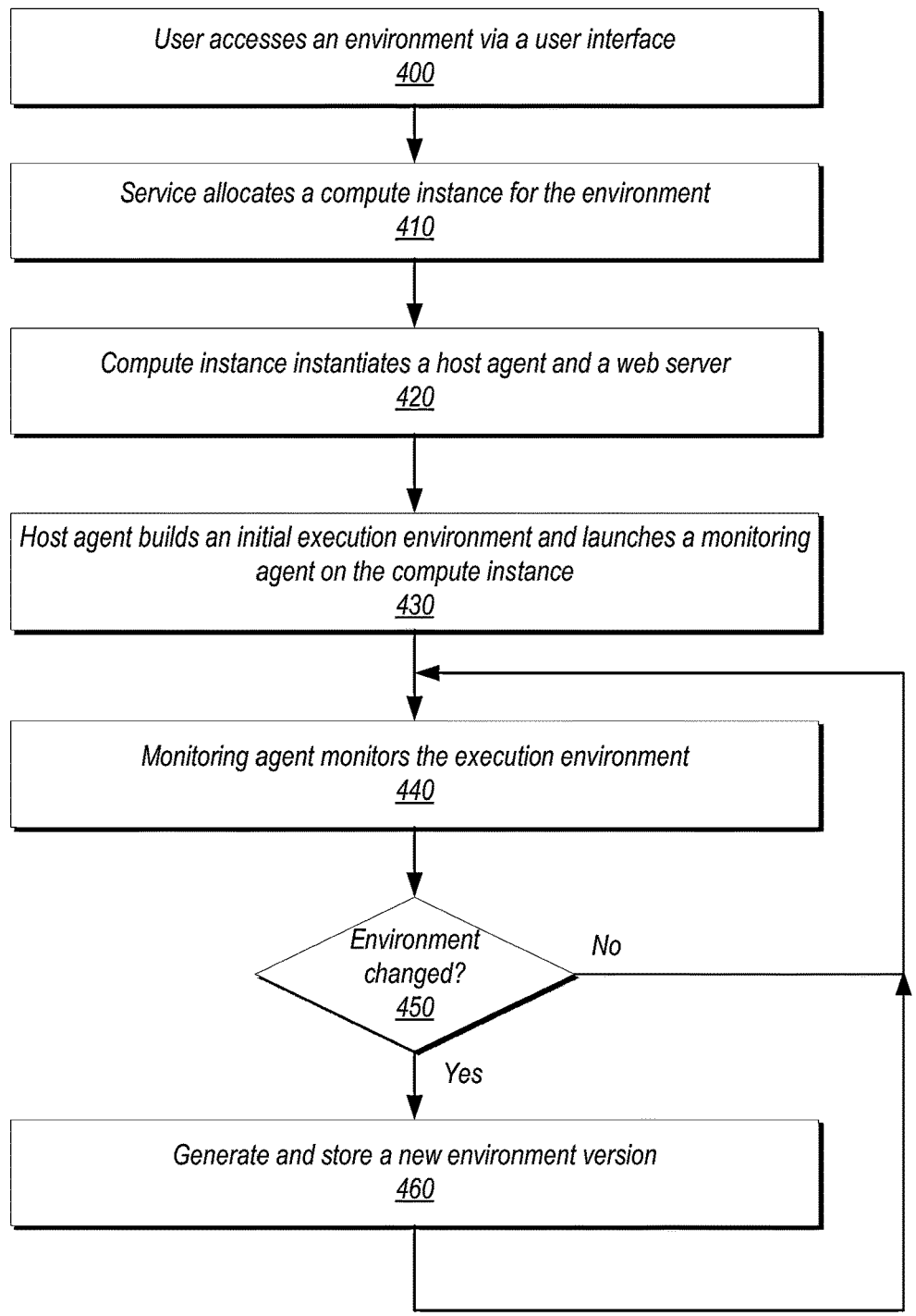
FIG. 4 is a flowchart of a method for initiating and persisting execution environments, according to some embodiments.

FIG. 4 is a flowchart of a method for initiating and persisting execution environments, according to some embodiments. As indicated at 400, a user accesses an environment via a user interface, for example a notebook interface to a web-based application as illustrated in FIG. 3. The user may, for example, access the computation service to sign on to an account for a web-based application. As indicated at 410, in response to the access, the service allocates a compute instance for the environment. If there are no compute instances already allocated to the user or if the service determines that the environment requires a new compute instance, then the service may allocate a compute instance on the provider network to the user for the environment, for example by calling a provider network service that manages and provides compute instances on host devices on the provider network. Alternatively, if one or more compute instance are already allocated to the user, the service may select one of the allocated compute instances.

As indicated at 420, the compute instance instantiates a host agent and a web server. In some embodiments, the web server is instantiated in an execution environment, for example a container-based execution environment. In some embodiments, the host agent builds and launches the web server execution environment on the compute instance. As indicated at 430, the host agent builds an initial execution environment on the compute instance and launches a monitoring agent on the compute instance. In some embodiments, the host agent obtains an environment version for the environment from storage, for example as illustrated in FIGS. 1 and 2, and builds the execution environment on the compute instance according to the information in the obtained environment version.

As indicated at 440, the monitoring agent monitors the execution environment on the compute instance. The user may modify the execution environment via the user interface, for example by adding one or more additional layers on top of a container base layer, removing one or more layers, and/or modifying configuration of a layer. At 450, upon detecting a change in the execution environment, a new environment version, for example as shown in FIG. 1, may be generated and stored in persistent storage on the provider network. In some embodiments, to generate and store a new environment version the monitoring agent generate a snapshot that includes the changes in the execution environment, and provides the snapshot to the API of the computation service. The computation service then generates the new environment version including the changes in the execution environment, and stores the new environment version to storage on the provider network, for example to a persistent context store for the respective user maintained by a storage service on the provider network.

In some embodiments, the monitoring agent may not cause a new environment version to be generated for each change. Instead, the monitoring agent may capture a snapshot periodically; the snapshot may include one or more changes to the execution environment, typically changes to a top layer of the execution environment. The snapshot, which may include more than one change, may then be provided to the computation service which generates a new environment version for the respective execution environment.

In some embodiments, the computation service may provide functionality to the user via the user interface and APIs that allows users to manage their persisted environment versions, for example that allow the user to select older environment versions to be loaded and executed, to delete environment versions, to share environment versions with other users, and so on. In some embodiments, an environment version may include an optional expiration date/time at which an older environment version may be automatically deleted or archived unless the user overrides the expiration.

Figure 5:
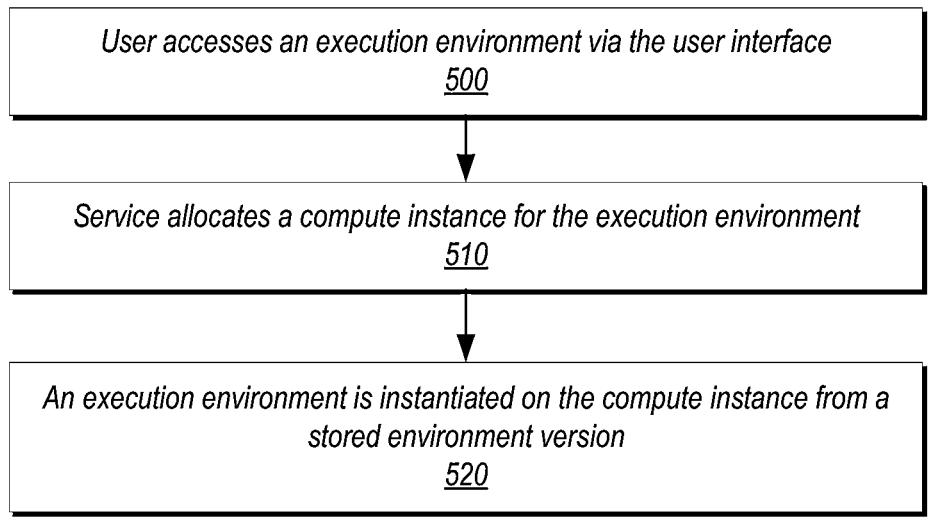
FIG. 5 is a high-level flowchart of a method for instantiating an execution environment on a compute instance from a stored environment version, according to some embodiments.

FIG. 5 is a high-level flowchart of a method for instantiating an execution environment on a compute instance from a stored environment version, according to some embodiments. As indicated at 500, a user accesses an environment interface via the user interface. As indicated at 510, the service allocates a compute instance for the execution environment. As indicated at 520, an execution environment is instantiated on the compute instance from a stored environment version. In some embodiments, a host agent on the compute instance obtains an environment version for the environment from storage, for example as illustrated in FIGS. 1 and 2, and builds the execution environment on the compute instance according to the information in the obtained environment version.

Figure 6:
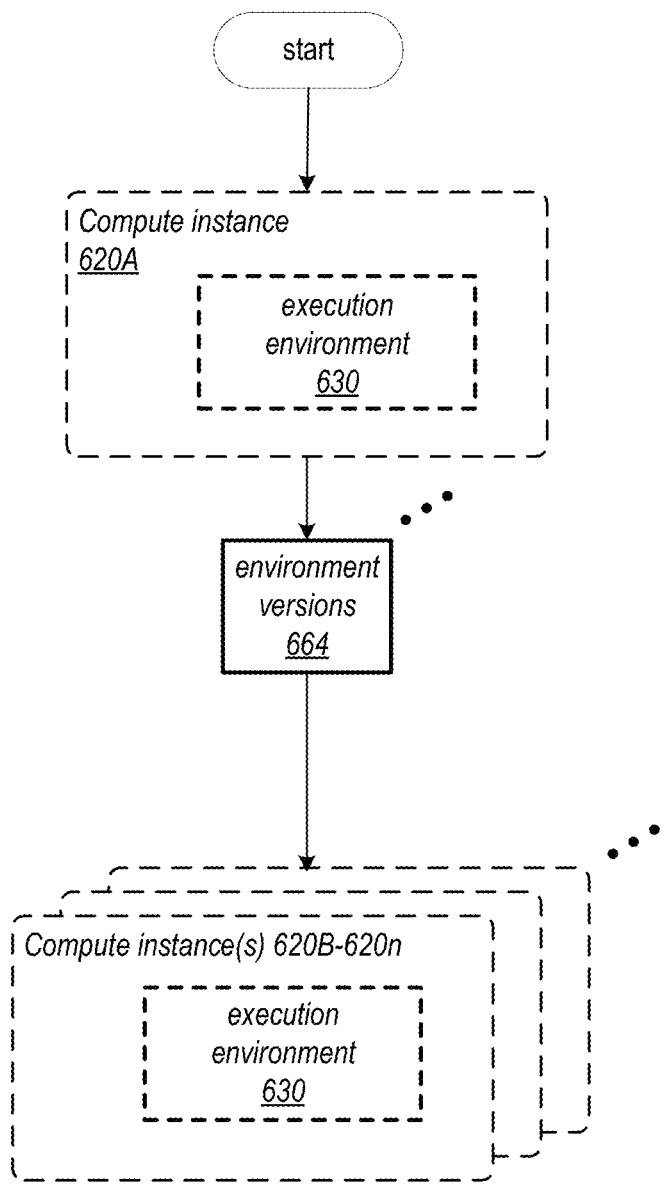
FIG. 6 illustrates generating and storing environment versions for an execution environment and instantiating instances of the execution environment on other compute instances from the environment versions, according to some embodiments.

FIG. 6 graphically illustrates generating and storing environment versions for an execution environment and instantiating instances of the execution environment on other compute instances from the environment versions, according to some embodiments. A user may access and work on an execution environment 630 on a first compute instance 620A, for example via a user interface as illustrated in FIGS. 2 and 3. One or more versions 664 of the execution environment 630, for example as illustrated in FIG. 1, may be stored to a persistent store, for example as illustrated in FIG. 2. The execution environment 630 may then be instantiated on one or more other compute instances 620B-620n based on the environment version(s) 664. In some embodiments, a host agent on a compute instance 620 may access an environment version 664 to pull down the components of the execution environment 630 as indicated in the respective environment version 664 and assemble the components on the respective compute instance 620, for example in response to the user selecting the respective environment via the user interface, or alternatively in response to another user to which an environment version 664 has been shared by the user activating the environment version 664 via a user interface.

Figure 7:
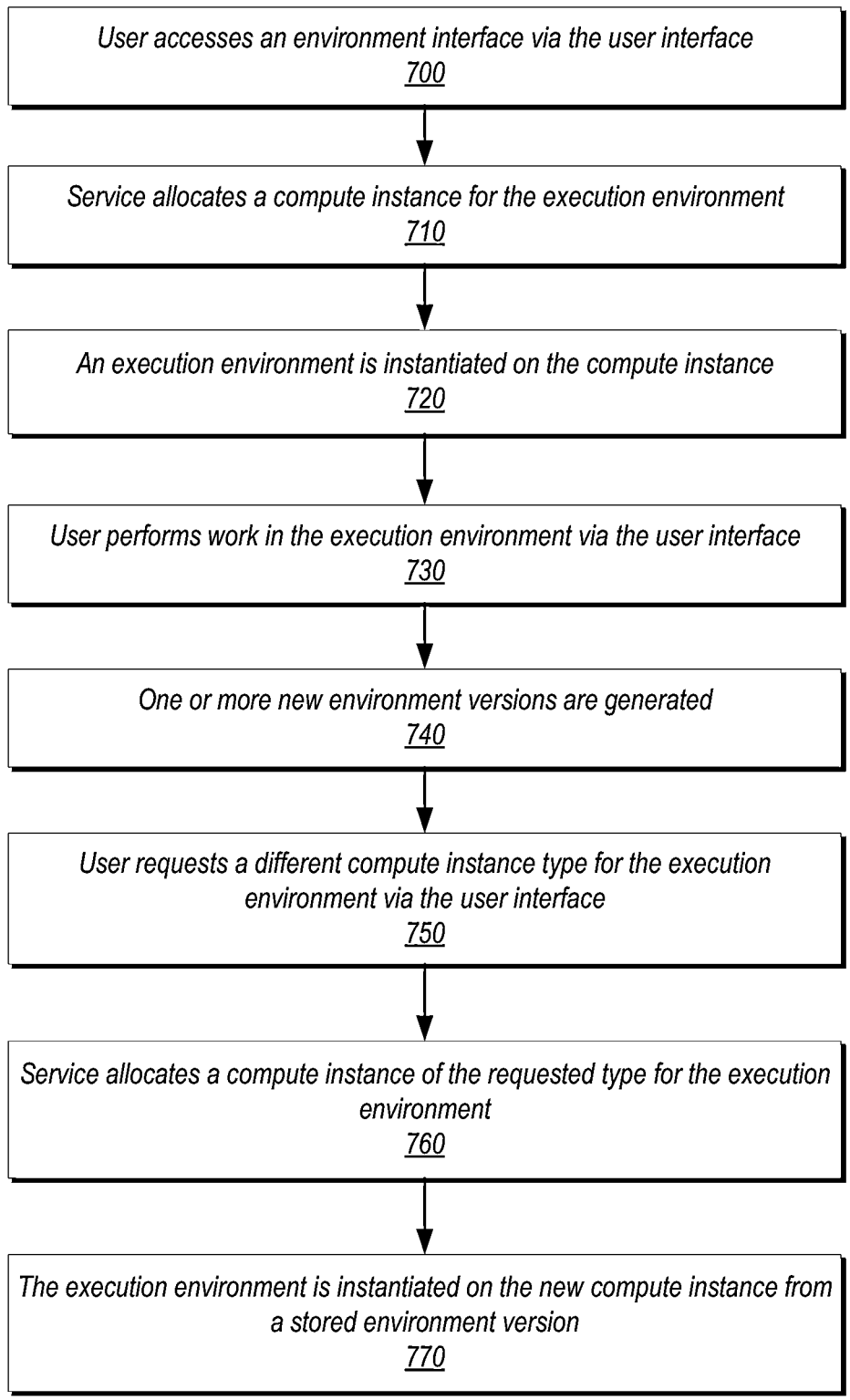
FIG. 7 is a flowchart of a method for switching compute instance types, according to some embodiments.

The computation service may provide two or more different types of compute instances for users on the provider network. For example, the compute service may provide a base type with relatively limited resources including processors and memory, a second type that includes a lot of memory for memory-intensive applications, a third type that includes extended processing power including one or more GPUs for computation-intensive applications, and so on. FIG. 7 is a flowchart of a method for switching compute instance types, according to some embodiments. As indicated at 700, a user accesses an environment interface via the user interface. As indicated at 710, the service allocates a compute instance for the execution environment. As indicated at 720, an execution environment is instantiated on the compute instance, for example by a host agent on the compute instance from a stored environment version. As indicated at 730, the user may perform work in the execution environment via the user interface. As indicated at 740, one or more new environment versions may be generated by the monitoring agent. As indicated at 750, the user may request a different compute instance type for the execution environment via the user interface. As indicated at 760, the service allocates a compute instance of the requested type for the execution environment. As indicated at 770, the execution environment is instantiated on the new compute instance from a stored environment version. The original compute instance may be deallocated.

In some embodiments, to instantiate the execution environment on the new compute instance, a host agent on the compute instance may obtain a previously generated environment version. The environment version includes an environment definition that includes a list of one or more layers of the execution environment including but not limited to a base layer (e.g., a container). The host agent then builds the execution environment including the one or more layers on the compute instance based on the environment definition, pulling components of the execution environment (e.g., the base container and one or more layers if present) from one or more stores of execution environment components on the provider network.

Serverless Computation Environments with Persistent Storage

Embodiments of serverless computation environments with persistent storage are described in reference to FIGS. 8A through 15G.

Figure 8A:
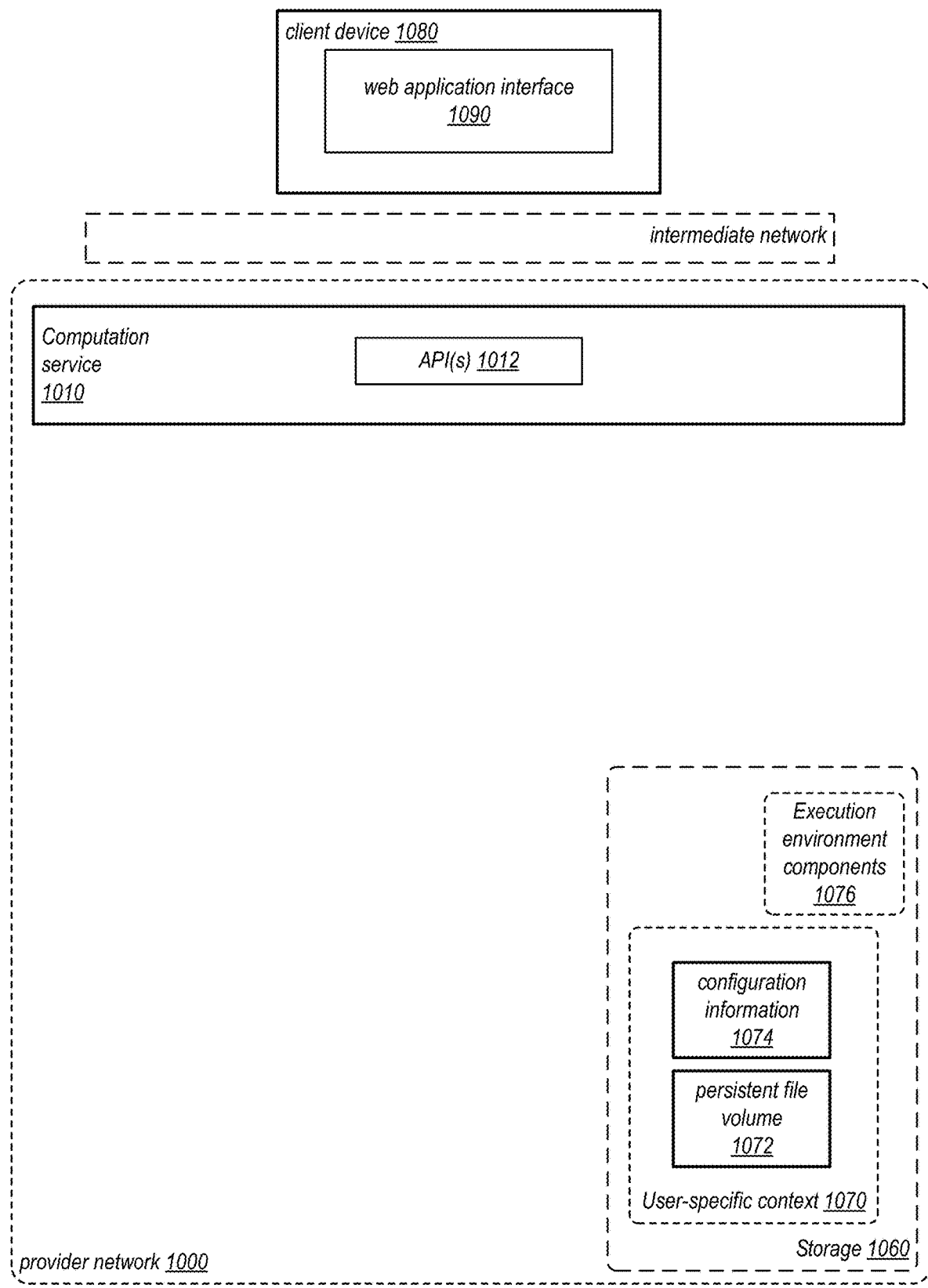
FIG. 8A illustrates a serverless computation environment with persistent storage for a web-based application on a provider network, according to some embodiments.

FIG. 8A illustrates a serverless computation environment with persistent storage for a web-based application on a provider network, according to some embodiments. A computation service 1010 may be provided on a provider network 1000. The computation service 1010 may provide one or more APIs 1012. A user may access the service 1010 on provider network 1000 via a web-based application interface 1090 (e.g., displayed in a browser program) on a client device 1080. An example user interface that may be used in some embodiments is illustrated in FIGS. 15A through 15G. A client device 1080 may, for example, be a desktop computer, a laptop/notebook computer, a tablet or pad device, a smartphone, or in general any device that is capable of providing a web-based application interface 1090 and connecting to the service 1010 over an intermediate network such as the Internet.

Each user of a web-based application may be provided with a persistent, user-specific context 1070 that includes, but is not limited to, a persistent file volume 1072 and configuration information 1074 for the respective user. The user-specific contexts 1070 may be persisted in storage 1060 provided by one or more storage services on the provider network 1000. Persistent file volume 1072 may store data for the user, for example notebook documents and associated data (code, results, etc.) that are associated with execution environments that the user may perform work on or in. In some embodiments, configuration information 1074 may include account-level configuration information for the user such as a default compute instance type for the user, the types and numbers of compute instances that the user is allowed (or not allowed) to use for the web-based application, maximum amount of storage 1060 that the user is allowed to use, what execution environment components 1076 that the user is allowed (or not allowed) to use, and so on that may be set by a web-based application manager. Configuration information 1074 may also include account-level configuration information that the user may be allowed to set, for example lifespans for environment versions or other data that the user generates through their work on notebook documents, preferred or default compute instance types, and so on. Configuration information 1074 may also store one or more environments that the user works in or on and their respective one or more environment versions that the user generates through their work on their notebook documents. Configuration information 1074 may also store other information for the user, for example indications of private networks and/or other resources on the provider network 1000 that are associated with the user.

Execution environment components for the web-based application 1076 (e.g., container images, packages, code modules, etc. that may be used to build execution environments in the web-based application) may also be stored in storage 1060 on the provider network.

Figure 8B:
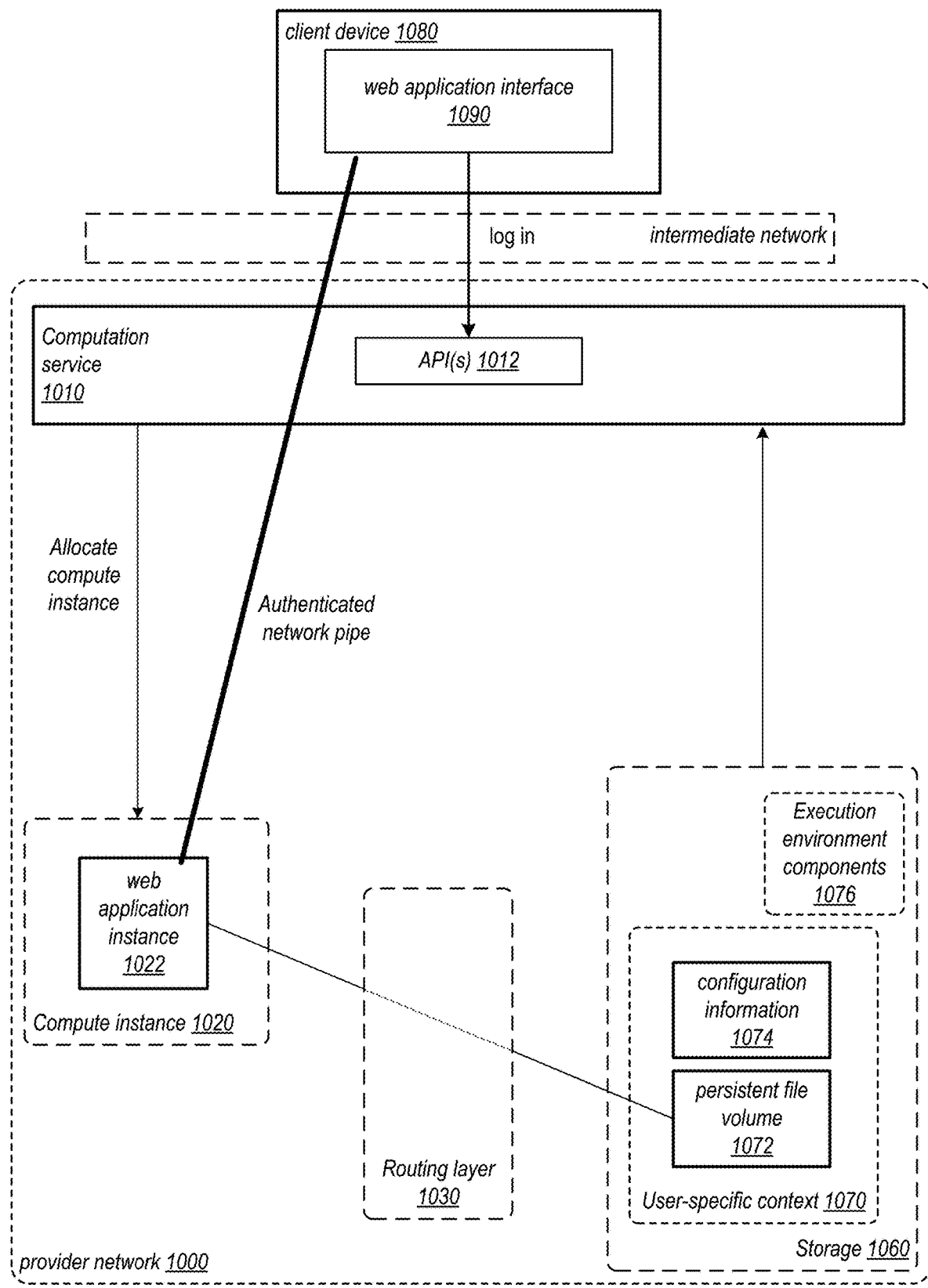
FIGS. 8B and 8C illustrate instantiating a network environment for a user, according to some embodiments.
Figure 8C:
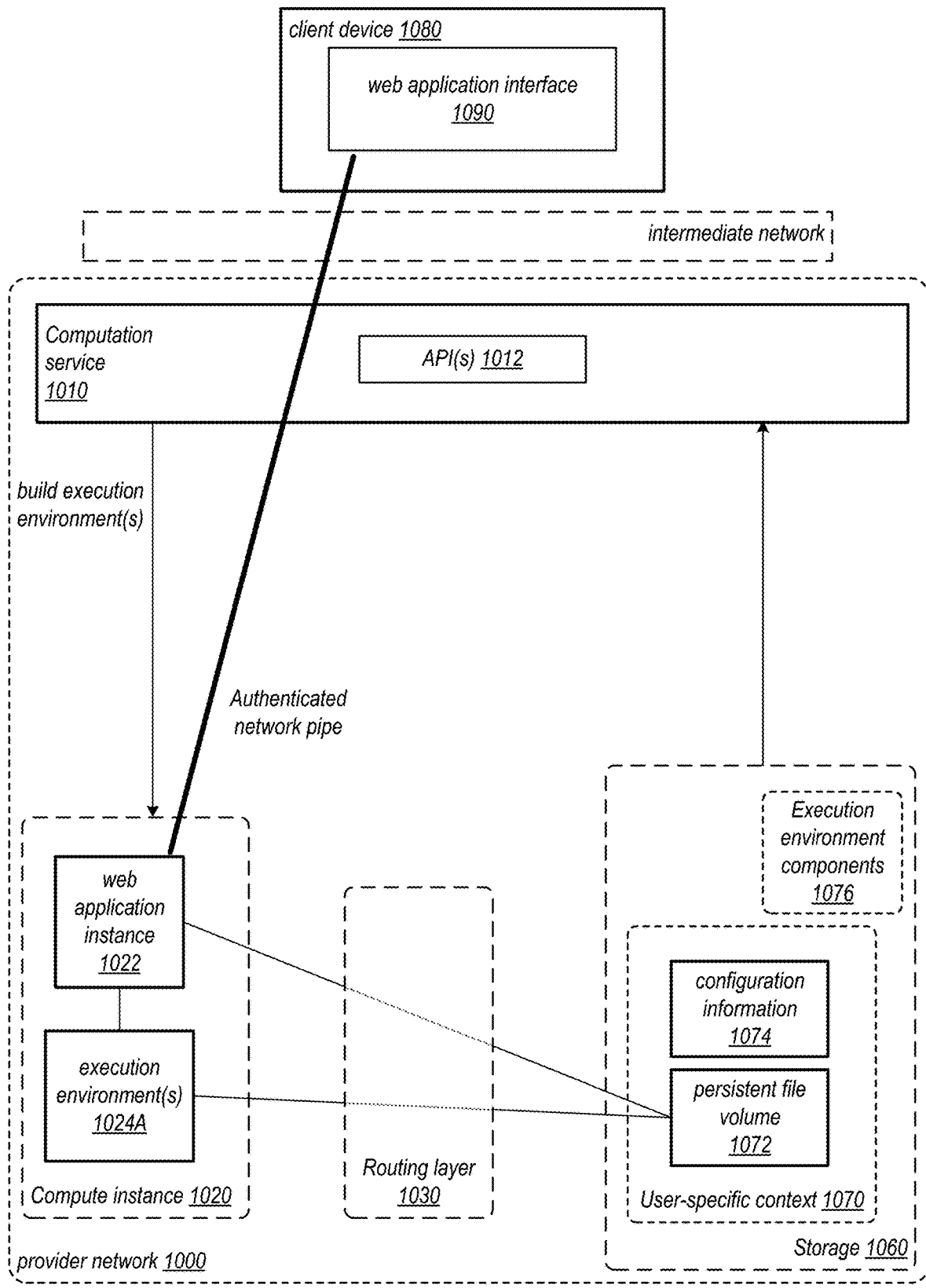
Figure 15A:
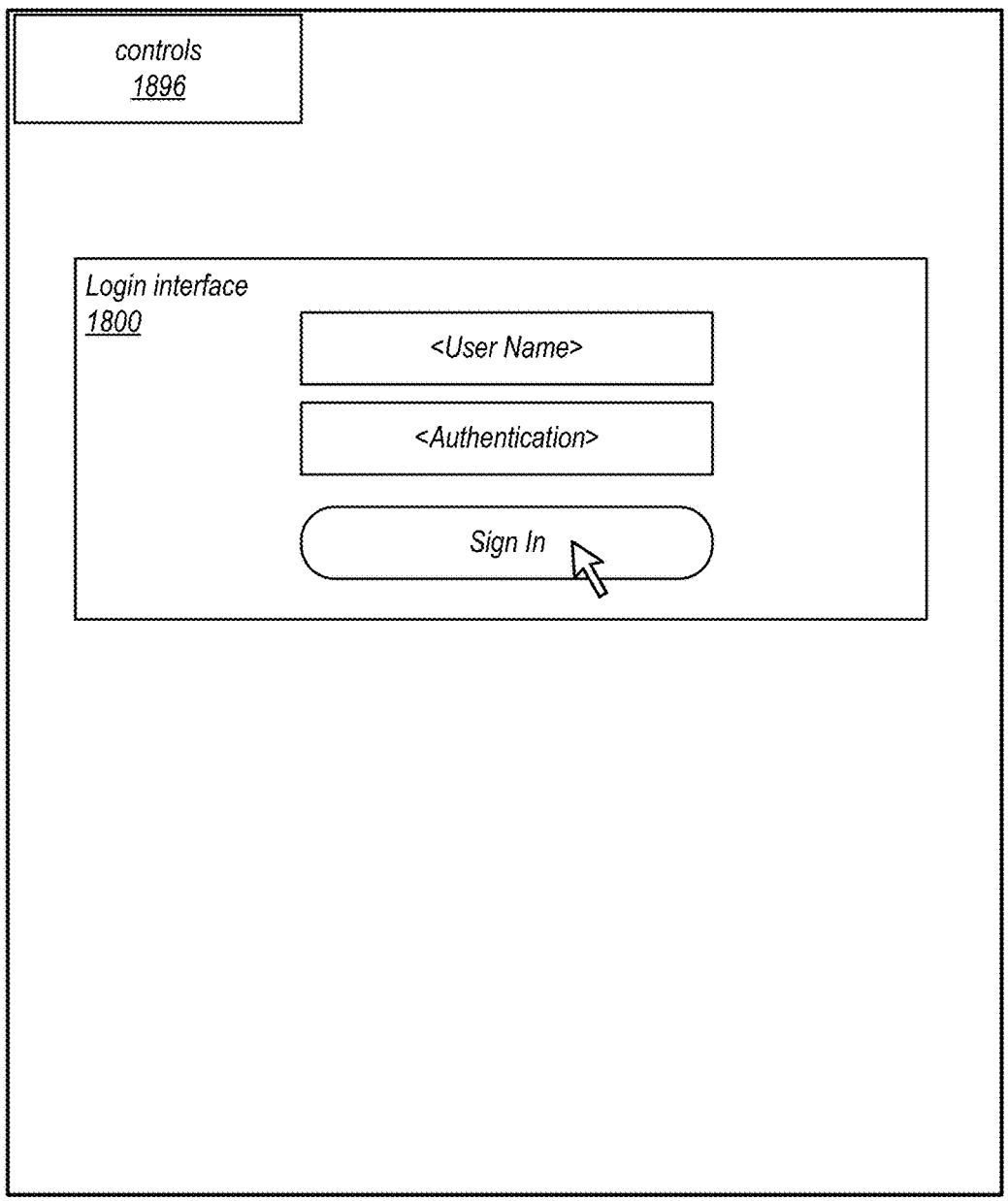
FIGS. 15A through 15G show example web application interfaces for performing the methods of FIGS. 10 through 14, according to some embodiments.

FIGS. 8B and 8C illustrate instantiating a network environment for a user, according to some embodiments. In FIG. 8B, a user logs into an account for a web-based application through an API 1012 to the service 1000 via a web application interface 1090, for example as illustrated in FIG. 15A. After authenticating the user, the service 1000 allocates a compute instance 1020 for the user according to the user's configuration information 1074 stored in the user's context 1070. An execution environment that implements a web application instance 1022 is instantiated on the compute instance 1020 according to the user's configuration information. The service 1010 then establishes an authenticated web pipe over an intermediate network and the provider network 1000 between the web application interface 1090 and the web application instance 1022 on the compute instance 1020. The service 1010 may also connect the web application instance 1022 to the user's provider network resources including, but not limited to, the persistent file volume 1072 via a routing layer 1030 on the provider network 1000 according to the user's configuration information. In some embodiments, the user may have or be associated with a virtual network on the provider network 1000 (see, e.g., FIG. 19), and the service 1010 may facilitate connecting the compute instance 1020 to the users' virtual network; the routing layer 1030 may be implemented by the virtual network.

In FIG. 8C, one or more execution environments 1024A may be instantiated on the compute instance 1020. In some embodiments, once the compute instance 1020 is allocated, the service 1010 may instantiate a host agent (not shown) on the compute instance 1020. In some embodiments, the host agent 221 is launched on the compute instance 1020 by the service 1010, and the host agent 210 then builds and launches the web application instance 1022 execution environment on the compute instance 1020. The service 1010 may then initiate the instantiation of one or more execution environments 1024A on the compute instance 1020 based on the user's configuration information. Alternatively, the web application instance 1022 may initiate the instantiation of one or more execution environments 1024A on the compute instance 1020. The host agent may then build the one or more initial execution environments 1024A on the compute instance 1020, each execution environment 1024A including one or more layers including a base layer (e.g., a container) and in some cases one or more additional layers. In some embodiments, the host agent also launches a monitoring agent (not shown) on the compute instance 1020 that monitors the execution environment(s) 1024A and causes new environment versions to be generated for the execution environment(s) 1024A upon detecting change(s) in the execution environment(s) 1024A.

In some embodiments, to build an execution environment 1024A, the host agent obtains an environment version for the environment from the user's context 1070, and builds the execution environment 1024A on the compute instance 1020 according to the information in the obtained environment version, for example by pulling one or more components 1076 as indicated in the environment version from storage 1060 and assembling the components 1076 on the compute instance 1020 as indicated in the environment version.

In some embodiments, an execution environment may include a base layer (e.g., a container) and one or more layers on top of the container. Container technology is a virtualization technology that allows applications to be developed as containers that can be deployed to and executed in container-based virtualization environments provided by container platforms on host machines, for example host devices in a provider network as illustrated in FIGS. 16 through 19. A container is a stand-alone executable package that executes in a container-based virtualization environment on a host machine and that includes resources needed to execute an application in the container-based virtualization environment: e.g., code, runtime, system tools, system libraries, and settings. A container platform virtualizes an operating system (OS) in order for multiple workloads (containers) to run on a single OS instance. An example container platform that may be used in embodiments is the Docker container platform. Note, however, that other container platforms may be used in embodiments. A container may implement one or more executables (e.g., kernels). In a notebook environment such as the Jupyter notebook environment, kernel is a program responsible for handling various types of requests (code execution, code completions, inspection, etc.) input via a user interface (e.g., a notebook interface), and for providing replies via the user interface. An example kernel is an iPythyon kernel; however, kernels for various other programming languages may be provided.

The execution environment(s) 1024A may be connected to the web application instance 1022 and to other resources in the user's network environment, including, but not limited to, the persistent file volume 1072, via a routing layer 1030.

Figure 8D:
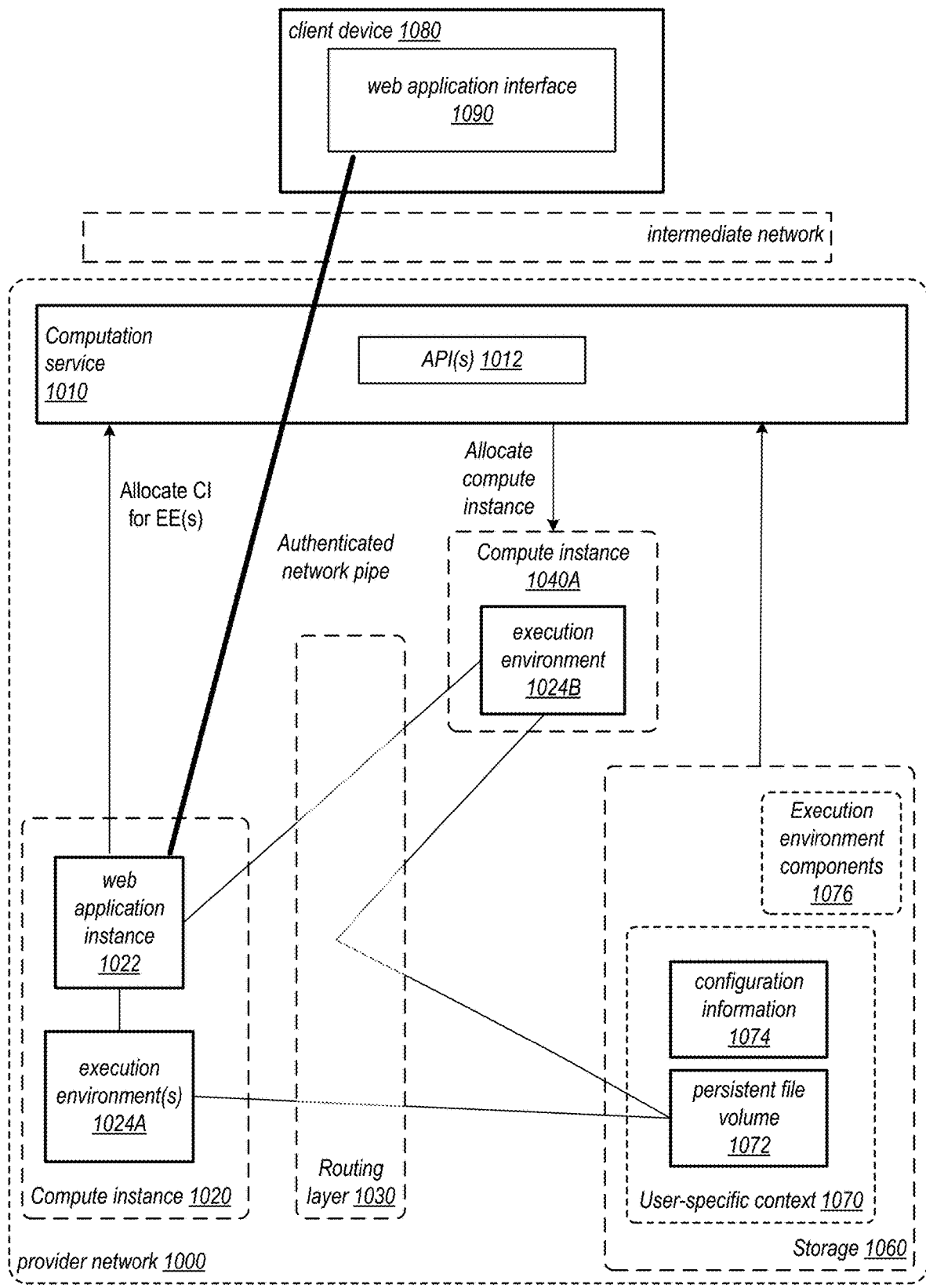
FIG. 8D illustrates a user launching an execution environment on a compute instance in the user's network environment, according to some embodiments.
Figure 15B:
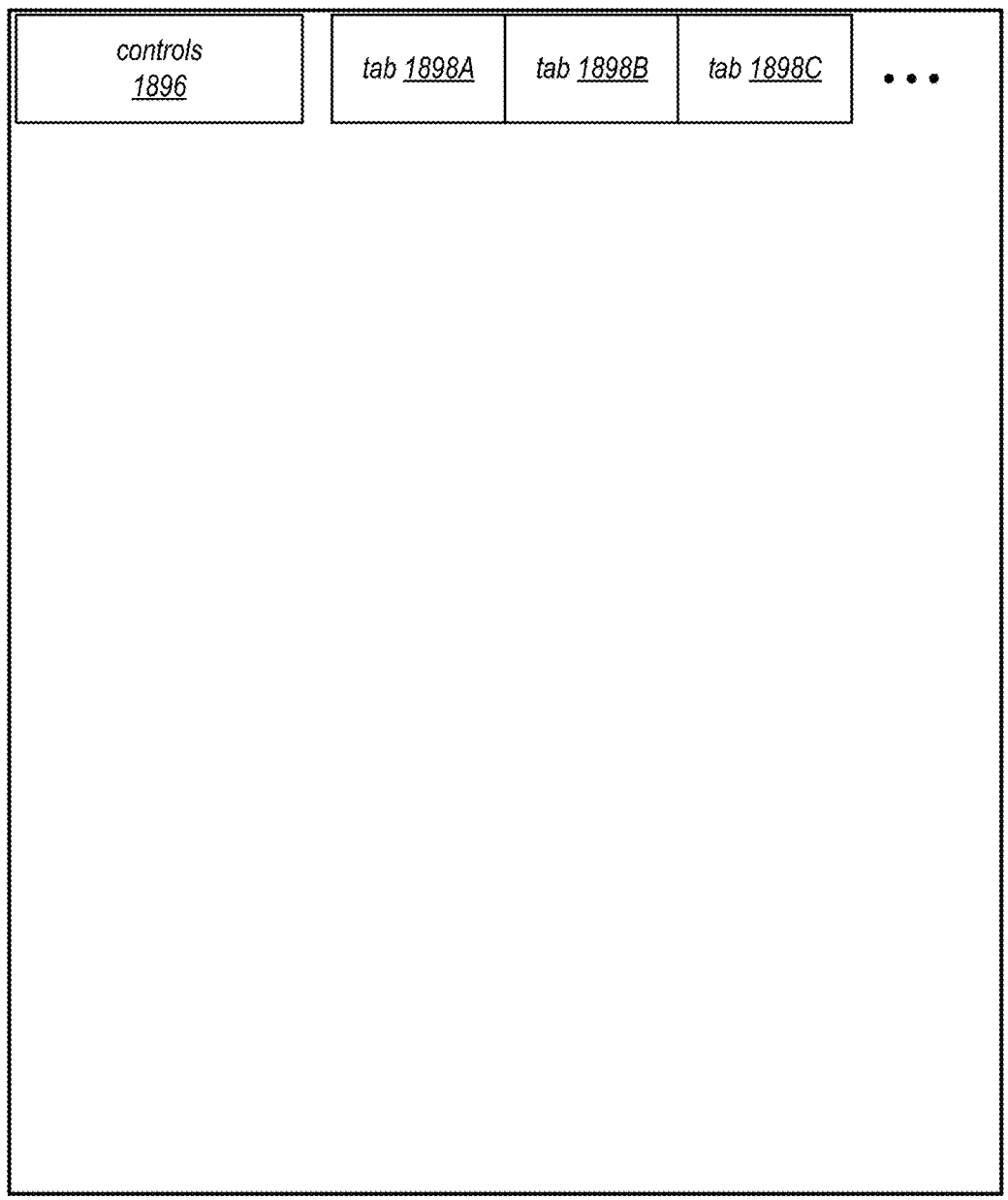
Figure 15C:
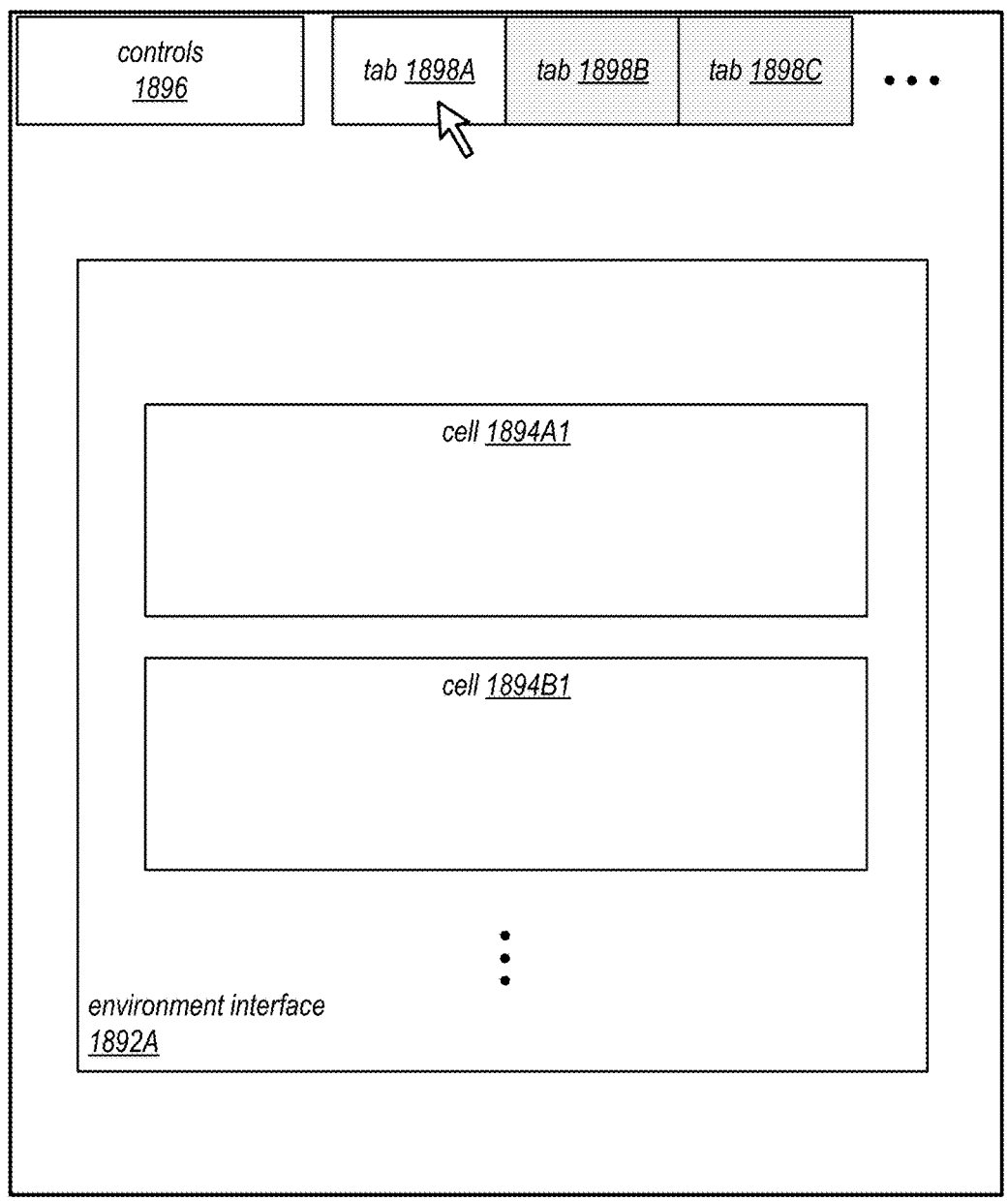

FIG. 8D illustrates the user launching an execution environment on a compute instance in the user's network environment, according to some embodiments. The user may activate an execution environment via the web application interface 1090, for example by selecting a tab as illustrated in FIGS. 15B and 15C. In some embodiments, the web application interface 1090 sends an indication of the activation to the web application instance 1022 via the network pipe; the web application instance 1022 then communicates with the service 1010 via an API 1012 to indicate that the user has activated the execution environment.

The service 1010 may determine from the configuration information 1074 and/or from the state of the user's network environment whether a new compute instance is needed for the requested execution environment. In some embodiments, as a default, the execution environment may be instantiated on an existing compute instance that meets the requirements of the execution environment as indicated in the configuration information 1074 if one is available. However, a new compute instance may be required if a compute instance is not available or if the configuration information 1074 indicates that a compute instance of a particular type is required for the execution environment or that the execution environment requires a dedicated compute instance. If the execution environment requires a new compute instance, then as shown in FIG. 8D the service 1010 allocates a new compute instance 1040A on the provider network 1000 for the execution environment according to the user's configuration information 1074. If a new compute instance is not required, then an existing compute instance in the user's network environment may be selected. The existing compute instance may be, but is not necessarily, the same compute instance 1020 that hosts the web application instance 1022. After a compute instance is allocated for the execution environment (e.g., compute instance 1040A as shown in FIG. 8D), the execution environment 1024B is instantiated on the compute instance 1040A according to the configuration information 1074.

The execution environment 1024B may be connected to the web application instance 1022 and to other resources in the user's network environment, including but not limited to the persistent file volume 1072, via routing layer 1030.

In some embodiments, to instantiate the execution environment 1024B on the compute instance 1040A, a host agent on the compute instance 1040A may obtain a previously generated version for the execution environment 1024B from the user's context 1070. The environment version includes an environment definition that includes a list of one or more layers of the execution environment 1024B including but not limited to a base layer (e.g., a container). The host agent then builds the execution environment 1024B including the one or more layers on the compute instance 1040A based on the environment definition, pulling components of the execution environment 1024B (e.g., the base container and one or more layers if present) from execution environment components 1076 stored on the provider network as necessary. In some embodiments, the components may also include components stored in the user's context 1070 on the provider network 1000.

Figure 8E:
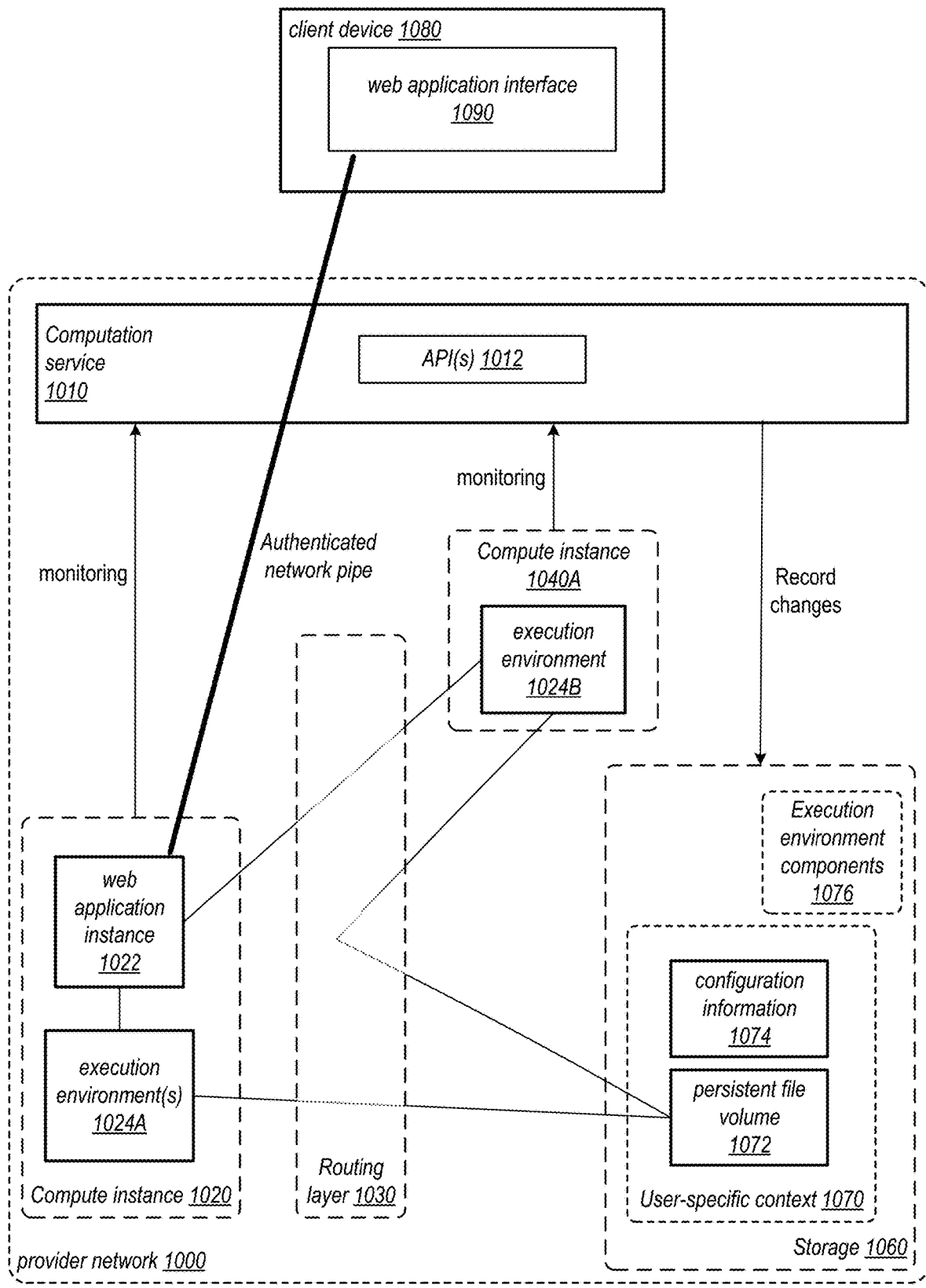
FIG. 8E illustrates the service monitoring execution environments and compute instances in the user's network environment, according to some embodiments.

FIG. 8E illustrates the service monitoring execution environments and compute instances in the user's network environment, according to some embodiments. In some embodiments, a monitoring agent (not shown) on each compute instance monitors the execution environment(s) on the respective compute instance, and causes new environment versions to be generated for the execution environment(s) upon detecting change(s) in the execution environment(s), for example by sending snapshots of the execution environment(s) to the service 1010 via an API 1012. The service 1010 may then generate and store new environment versions for the execution environments that include the updated information from the snapshots to the user's context 1070.

In some embodiments, the computation service 1010 may also monitor activity on the compute instances in a user's network environment. For example, in some embodiments, an agent on a compute instance may monitor activity on the respective compute instance, and may report activity (or inactivity) to the service 1010 via an API 1012.

Figure 8F:
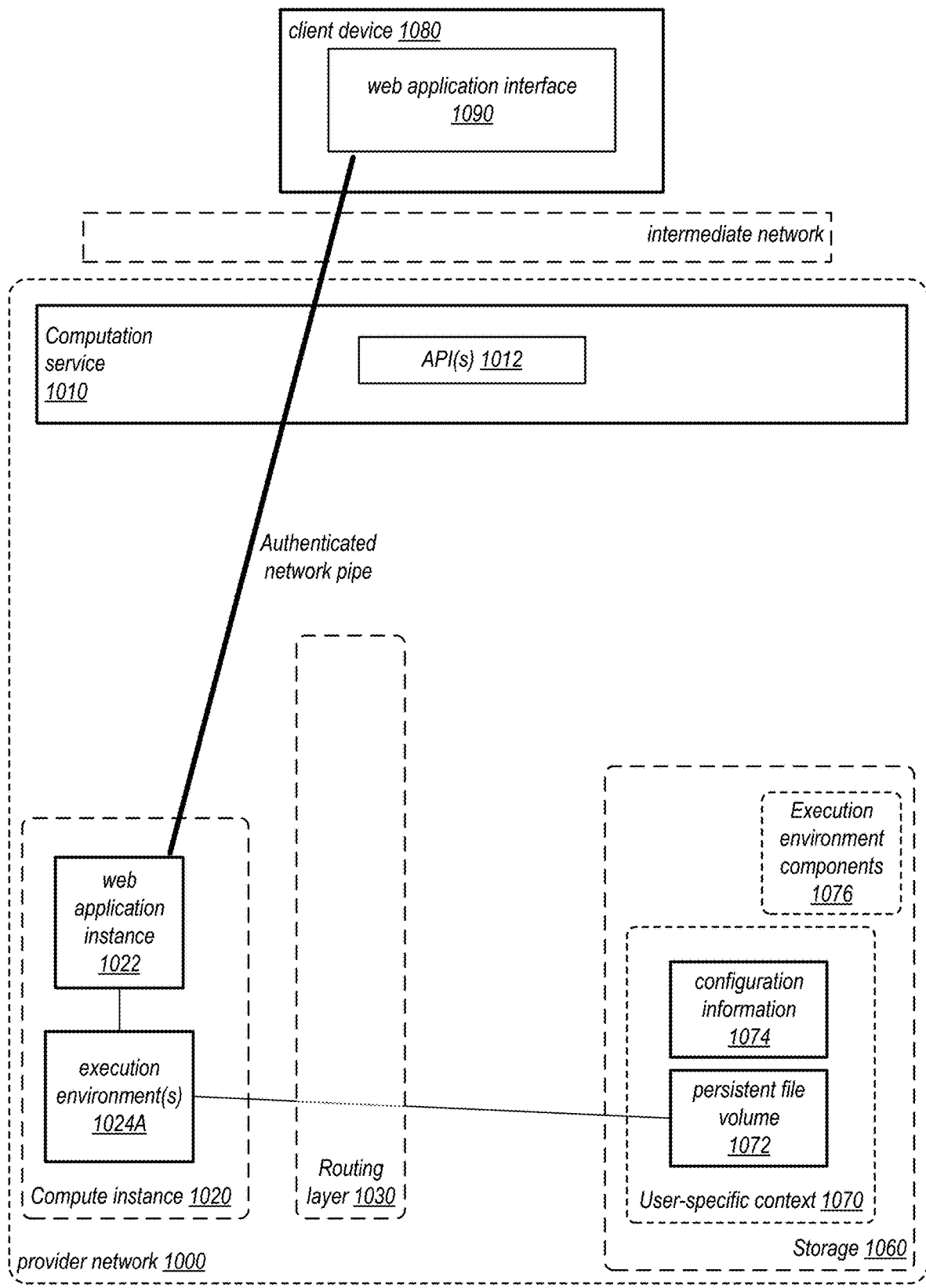
FIG. 8F illustrates the service deallocating a compute instance including an execution environment in the user's network environment in response to a time out, according to some embodiments.

FIG. 8F illustrates the service deallocating a compute instance including an execution environment in the user's network environment in response to a time out, according to some embodiments. In response to determining that a compute instance is in an idle state, for example compute instance 1040A shown in FIG. 8E, the service 1010 deallocates the compute instance 1040A, updating the configuration information 1074 for one or more execution environments 1024 on the compute instance 1040A if necessary. In some embodiments, the service 1010 may query a monitoring agent on the compute instance 1040A to obtain any pending updates for execution environment(s) 1024 on the compute instance 1040A before deallocating the compute instance 1040A, and may create new versions for the execution environment(s) 1024 if necessary. Deallocating the compute instance 1040A may involve disconnecting the compute instance 1040A from the user's account (and from any resources that the instance 1040A is connected to); since the compute instance is no longer connected to the user's account, the provider network 1010 does not charge the user's account for use of that compute instance 1040A. Note, however, that the compute instance 1040A may still exist on the provider network 1010, and may be made available to be reallocated to the same account or user (or to a different account or user) if necessary.

Figure 8G:
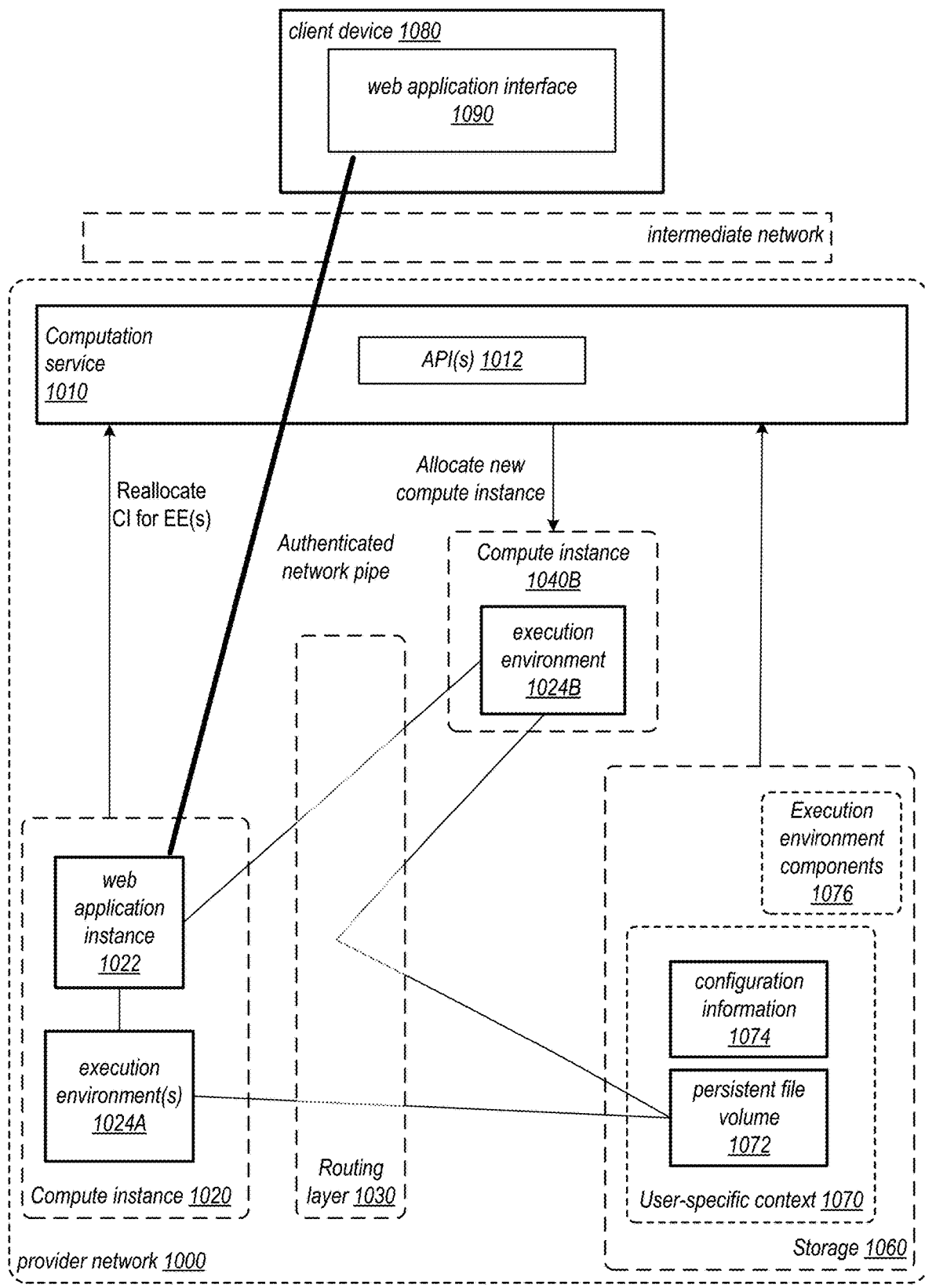
FIG. 8G illustrates the service allocating another compute instance for the execution environment in the user's network environment in response to the user accessing the execution environment, according to some embodiments.

FIG. 8G illustrates the service allocating another compute instance for the execution environment in the user's network environment in response to the user accessing the execution environment, according to some embodiments. The user may access one of the execution environments 1024 that was on the deallocated compute instance (e.g., compute instance 1040A of FIG. 8E) via the web application interface 1090. For example, the user may select a tab corresponding to the execution environment 1024 in a notebook document displayed on the web application interface 1090 as shown in FIG. 15C. In response to the access of the execution environment 1024, the service 1010 may access the user's configuration information 1074 in their context, allocate a new compute instance 1040B for the execution environment according to the user's configuration information 1074 as shown in FIG. 8G, and instantiate one or more execution environments 1024 including the accessed execution environment on the new compute instance 1040B according to the user's configuration information 1074. The one or more execution environments 1024 may be instantiated from previously stored versions of the execution environment(s) obtained from the user's context 1070. From the user's perspective, the user may not know and may not be able to detect that their execution environment(s) 1024 are now on a different backend compute instance; to the user, it appears that they are still using the same "computer", possibly noticing only a slight delay of a few seconds before the execution environments 1024 are activated.

Figure 8H:
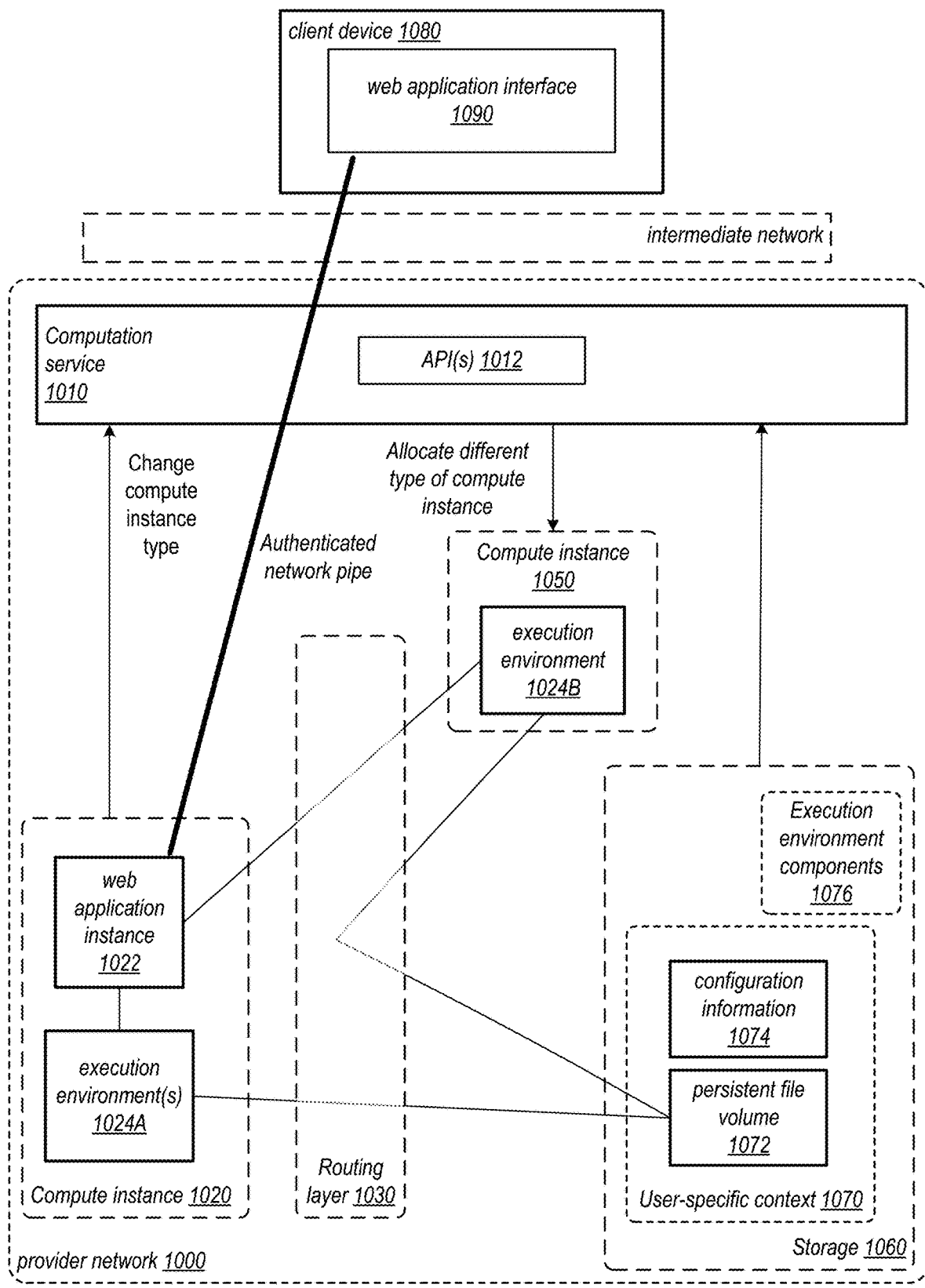
FIG. 8H illustrates the service allocating a compute instance of another type for a compute instance in the user's network environment, according to some embodiments.

FIG. 8H illustrates the service allocating a compute instance of another type for a compute instance in the user's network environment, according to some embodiments. A user may activate an execution environment via the web application interface 1090. For example, the user may select a tab corresponding to the execution environment 1024B shown in FIG. 8E in a notebook document displayed on a web application interface 1090 as shown in FIG. 15B. In response to the access of the execution environment 1024B, the service 1010 may access the user's configuration information 1074 in their context 1070, allocate a compute instance 1040A for the execution environment 1024B according to the user's configuration information 1074 as shown in FIG. 8E, and instantiate the execution environment 1024B on the compute instance 1040A according to the user's configuration information 1074 as shown in FIG. 8E. The execution environment 1024B may be instantiated from a previously stored version of the execution environment.

Figure 15D:
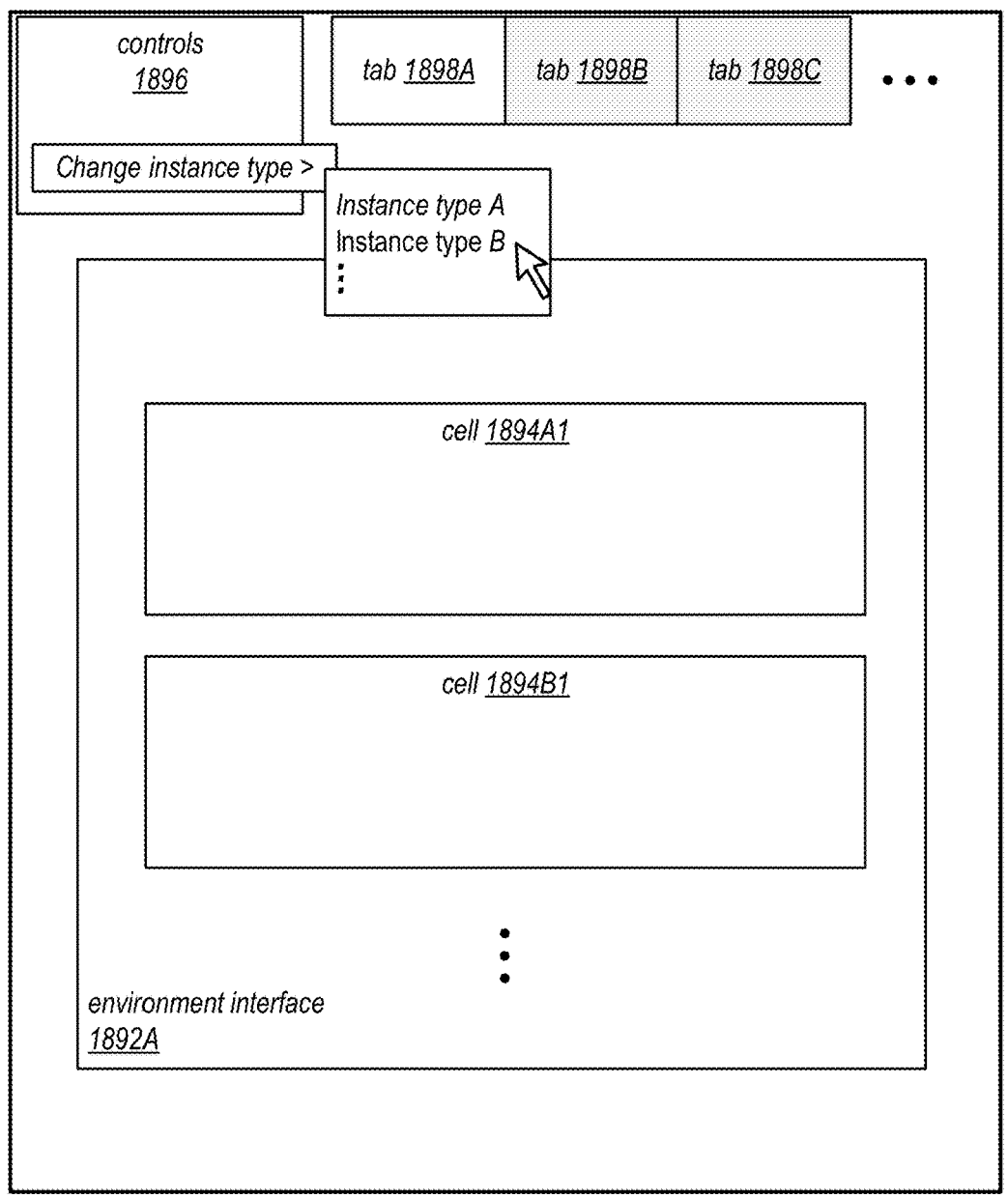

The computation service 1010 may provide two or more different types of compute instances with different sets of compute resources for users on the provider network. For example, the computation service 1010 may provide a base type with relatively limited resources including processors and memory, a second type that includes a lot of memory for memory-intensive applications, a third type that includes extended processing power including one or more GPUs for computation-intensive applications, and so on. In some embodiments, the user may select a different compute instance type for an execution environment (e.g., for execution environment 1024B instantiated on compute instance 1040A of a first type) via the web application interface 1090. For example, the user may work on an execution environment 1024B (e.g., modifying code in one or more cells of a notebook interface as illustrated in FIG. 15C), and when ready to execute the code in the execution environment 1024B, may select a different type of compute instance (e.g., a compute instance type with a lot of GPUs) to run the execution environment 1024B via the web application interface 1090 as illustrated in FIG. 15D.

In response to the selection of the different instance type for the execution environment 1024B, the service 1010 may deallocate the current compute instance 1040A, updating the configuration information 1074 for the execution environment 1024B if necessary. The service then allocates a new compute instance 1050 of the selected type on the provider network 1010 for the execution environment 1024B. The execution environment 1024B is then instantiated on the new compute instance 1050 according to the user's configuration information 1074. In some embodiments, to instantiate the execution environment 1024B on the compute instance 1050, a host agent on the compute instance 1050 may obtain a previously generated version for the execution environment 1050 from the user's context 1070. The version includes an environment definition that includes a list of one or more layers of the execution environment 1024B including but not limited to a base layer (e.g., a container). The host agent then builds the execution environment 1024B including the one or more layers on the compute instance based on the environment definition, pulling components of the execution environment 1024B (e.g., the base container and one or more layers if present) from one or more stores of execution environment components 1076 on the provider network 1000.

Figure 9:
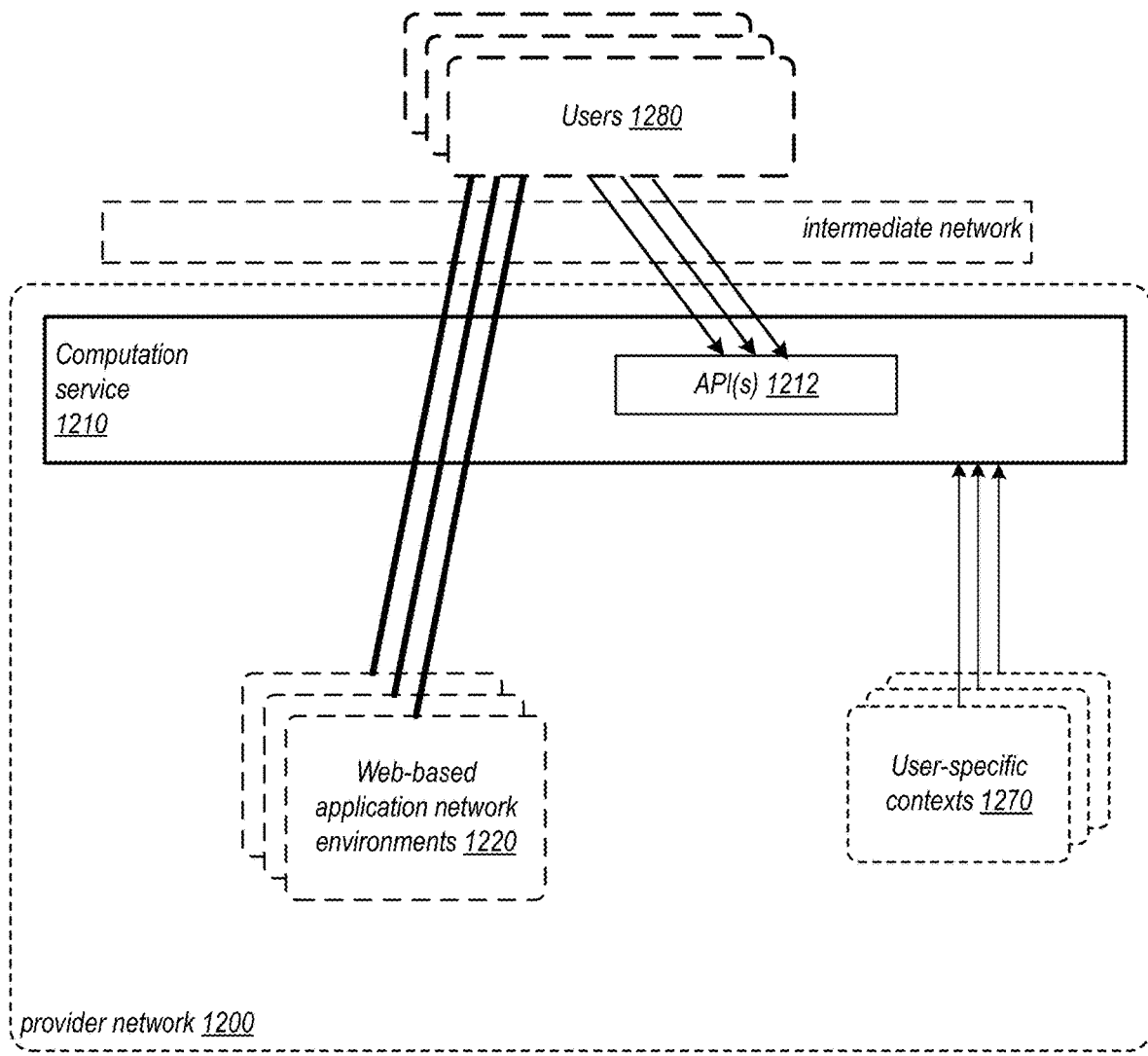
FIG. 9 illustrates multiple users of the web-based application each with their own user-specific contexts and network configurations, according to some embodiments.

FIG. 9 illustrates multiple users of the web-based application each with their own user-specific contexts and network configurations, according to some embodiments. As shown, in some embodiments, each user 1280 of a web-based application may be provisioned with a user-specific context 1270 on the provider network 1200. Upon logging in to the web-based application via an API 1212 to the computation service 1210, each user may be provisioned with a network environment 1220 on the provider network 1000. Typically, each network environment may include a compute instance that hosts an execution environment that implements a web application instance. The compute instance hosting the web application instance may also include one or more execution environments corresponding to notebook documents associated with the respective user. A user's network environment may also, but does not necessarily, include one or more additional compute instances each hosting one or more execution environments.

Figure 10:
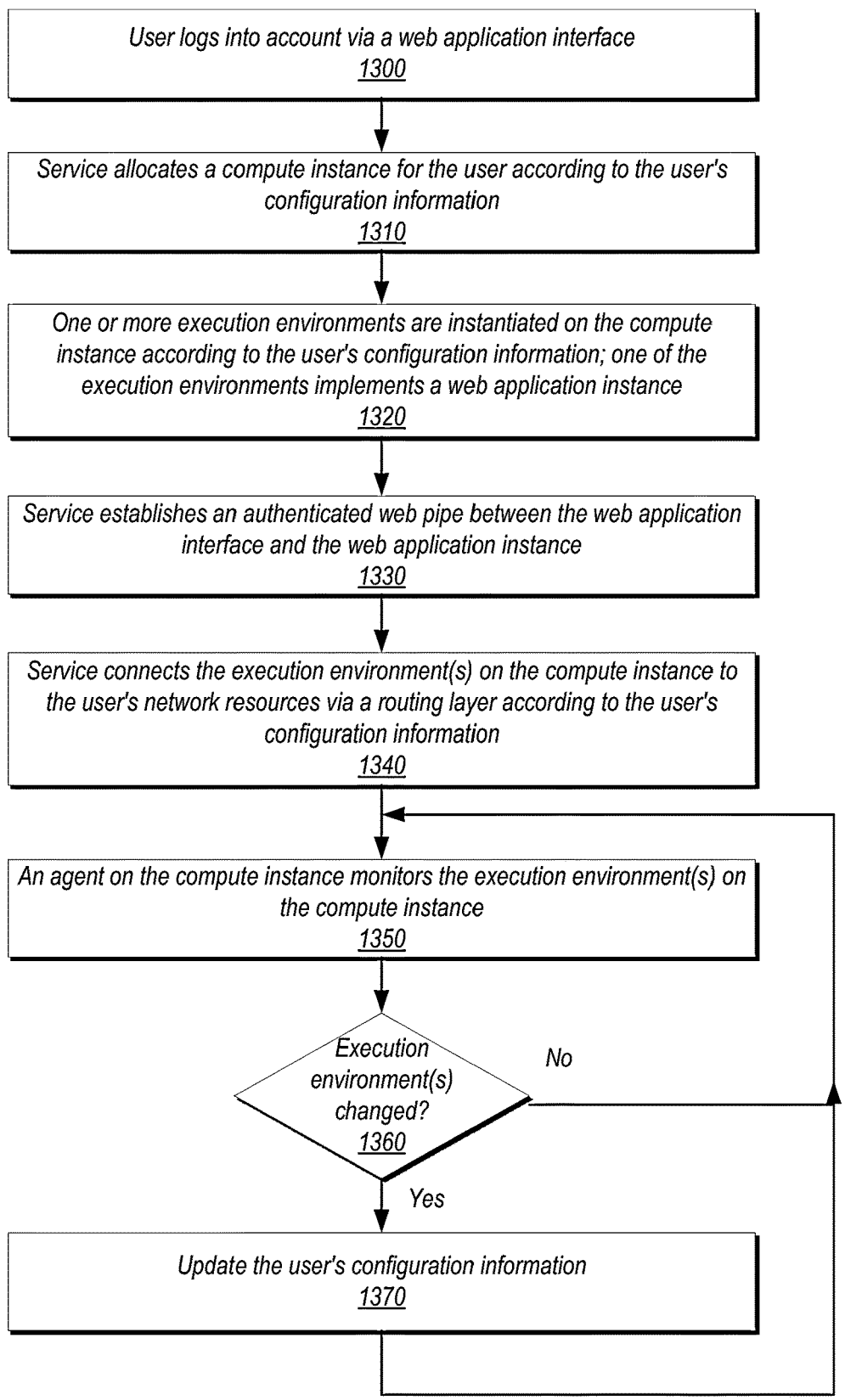
FIG. 10 is a flowchart of a method for instantiating a network environment for a user and recording changes in the network environment, according to some embodiments.

FIG. 10 is a flowchart of a method for instantiating a network environment for a user and recording changes in the network environment, according to some embodiments. As indicated at 1300, a user logs into an account for a web-based application via a web application interface, for example as illustrated in FIG. 15A. As indicated at 1310, after authenticating the user, the service allocates a compute instance for the user according to the user's configuration information stored in the user's context. As indicated at 1320, one or more execution environments are instantiated on the compute instance according to the user's configuration information; one of the execution environments implements a web application instance for the web-based application. As indicated at 1330, the service establishes an authenticated web pipe between the web application interface and the web application instance. As indicated at 1340, the service connects the execution environment(s) on the compute instance to the user's network resources via a routing layer according to the user's configuration information. As indicated at 1350, a monitoring agent on the compute instance monitors the execution environment(s) on the compute instance. At 1360, upon detecting a change in one of the execution environments, the monitoring agent notifies the service to update the user's configuration information as indicated at 1370. For example, the monitoring agent may take "snapshots" of an execution environment, and may send a snapshot of the execution environment to the service, which then generates a new version of the execution environment based on the snapshot which is stored in the user's context.

Figure 11:
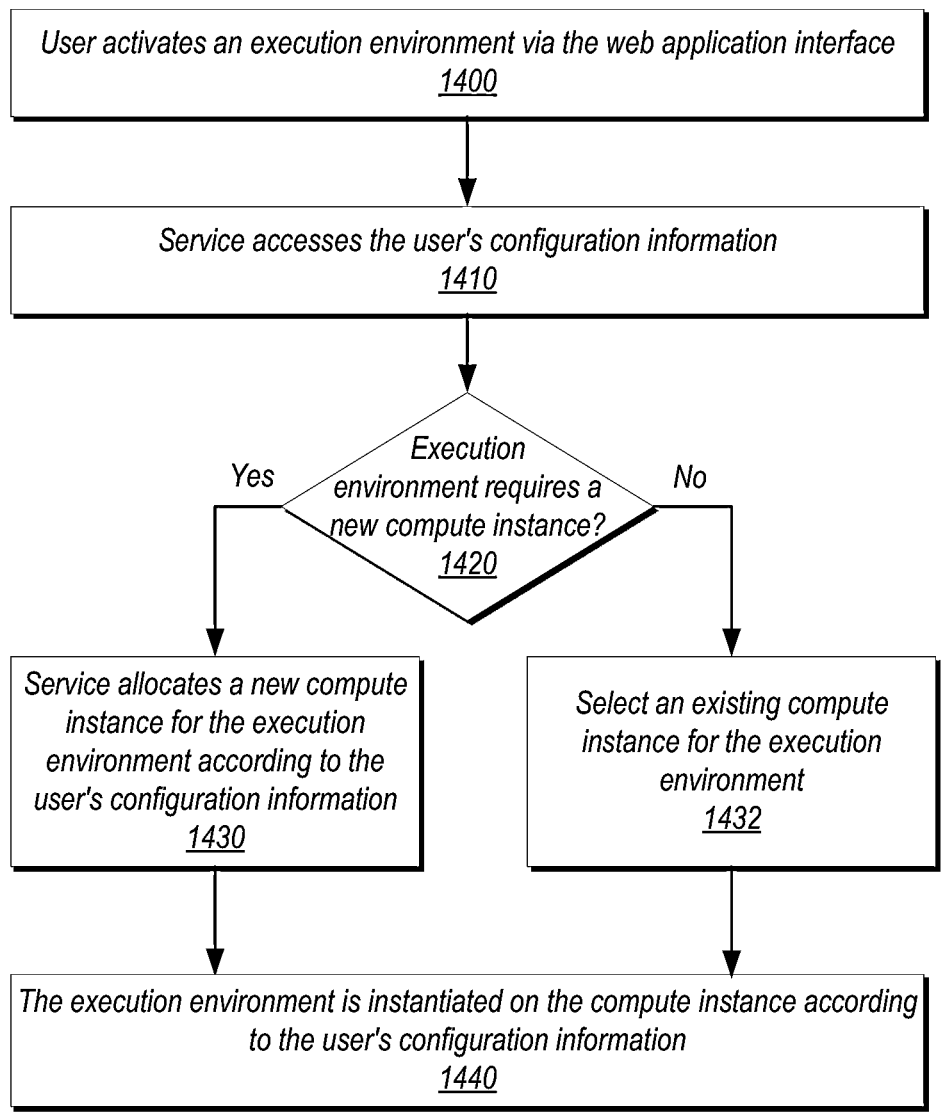
FIG. 11 is a flowchart of a method for activating an execution environment in a user's network environment, according to some embodiments.

FIG. 11 is a flowchart of a method for activating an execution environment in a user's network environment, according to some embodiments. As indicated at 1400, a user activates an execution environment via the web application interface, for example by selecting a tab as illustrated in FIGS. 15B and 15C. As indicated at 1410, in response to the activation, the service accesses the configuration information in the user's context. In some embodiments, the web application interface sends an indication of the activation to the web application instance in the user's network environment via the network pipe; the web application instance then communicates with the service via an API to indicate that the user has activated the execution environment.

The service may determine from the user's configuration information and/or from the state of the user's network environment whether a new compute instance is needed for the execution environment. In some embodiments, as a default, the execution environment may be instantiated on an existing compute instance that meets the requirements of the execution environment as indicated in the configuration information if one is available. However, a new compute instance may be required if a compute instance is not available or if the configuration information indicates that a compute instance of a particular type is required for the execution environment or that the execution environment requires a dedicated compute instance. At 1420, if the execution environment requires a new compute instance, then at 1430 the service allocates a new compute instance on the provider network for the execution environment according to the user's configuration information. At 1420, if a new compute instance is not required, then as indicated at 1432 an existing compute instance in the user's network environment may be selected. The existing compute instance may be, but is not necessarily, the same compute instance that hosts the web application instance in an execution environment. As indicated at 1440, the execution environment is then instantiated on the compute instance according to the configuration information. In some embodiments, to instantiate the execution environment on the compute instance, a host agent on the compute instance may obtain a previously generated version for the execution environment. The version includes an environment definition that includes a list of one or more layers of the execution environment including but not limited to a base layer (e.g., a container). The host agent then builds the execution environment including the one or more layers on the compute instance based on the environment definition, pulling components of the execution environment (e.g., the base container and one or more layers if present) from one or more stores of execution environment components on the provider network. The components may include but are not limited to components stored in the user's context on the network.

Figure 12:
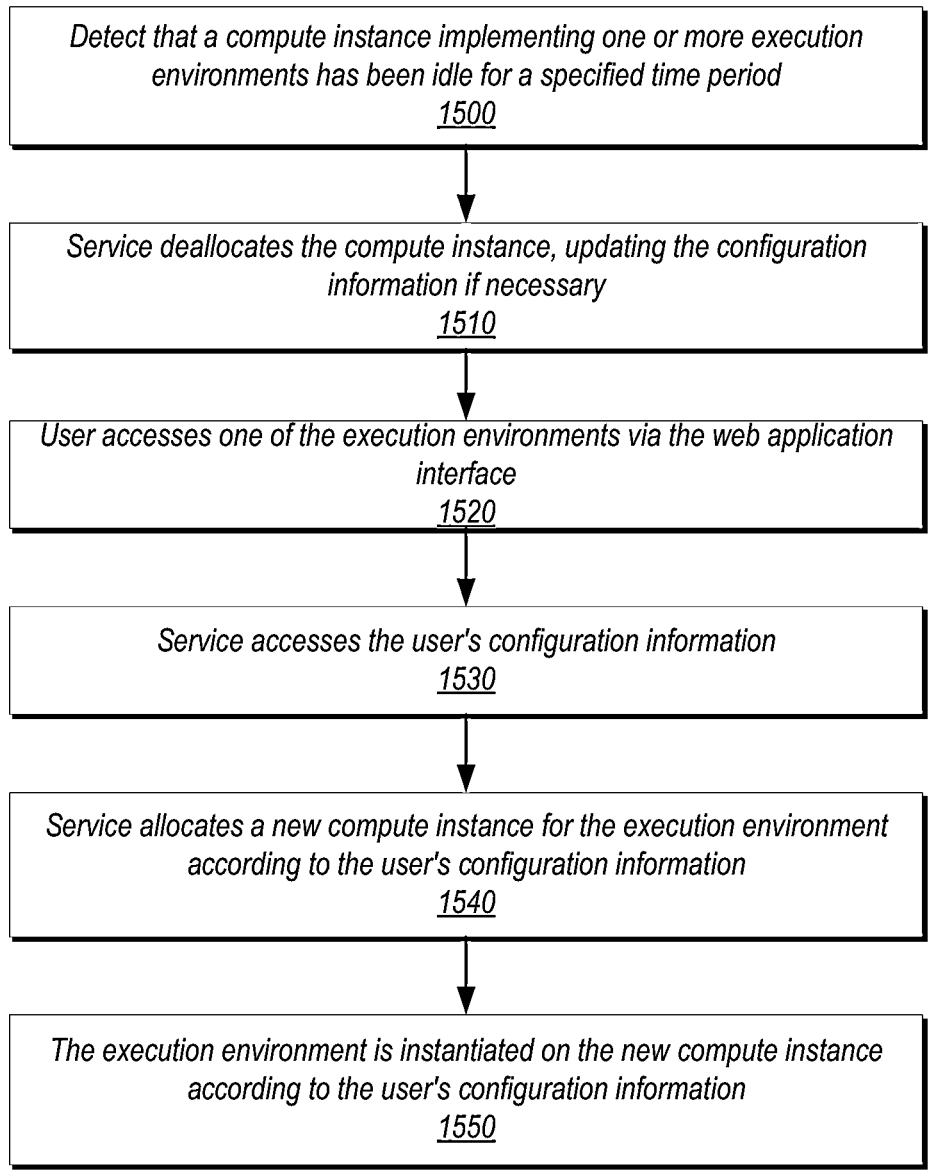
FIG. 12 is a flowchart of a method for deallocating and reallocating compute instances in a user's network environment, according to some embodiments.

FIG. 12 is a flowchart of a method for deallocating and reallocating compute instances in a user's network environment, according to some embodiments. The computation service may monitor compute instances in a user's network environment. For example, in some embodiments, an agent on a compute instance may monitor activity on the respective compute instance, and may report activity (or inactivity) to the service via an API. As indicated at 1500, the service may detect that a compute instance implementing one or more execution environments has been idle for a specified time period. In some embodiments, an agent of the service on a compute instance may monitor activity on the compute instance, and may report activity (or lack thereof) on the compute instance to the service. As indicated at 1510, in response to determining that a compute instance is in an idle state, the service deallocates the compute instance, updating the configuration information for one or more execution environments on the compute instance if necessary. In some embodiments, the service may query a monitoring agent on the compute instance to obtain any pending updates for execution environment(s) on the compute instance before deallocating the compute instance, and may create new versions for the execution environment(s) if necessary. Deallocating the compute instance may involve disconnecting the compute instance from the user's account; since the compute instance is no longer connected to the user's account, the provider network does not charge the user's account for use of that compute instance. Note, however, that the compute instance may still exist on the provider network, and may be made available to be reallocated to the same account or user (or to a different account or user) if necessary.

As indicated at 1520, the user may access one of the execution environments that was on the deallocated compute instance via the web application interface. For example, the user may select a tab corresponding to the execution environment in a notebook document displayed on the web application interface as shown in FIG. 15C. In response to the access of the execution environment, the service may access the user's configuration information in their context as indicated at 1530, allocate a new compute instance for the execution environment according to the user's configuration information as indicated at 1540, and instantiate one or more execution environments including the accessed execution environment on the new compute instance according to the user's configuration information. The one or more execution environments may be instantiated from previously stored versions of the execution environment(s). From the user's perspective, the user may not know and may not be able to detect that their execution environment(s) are now on a different backend compute instance; to the user, it appears that they are still using the same "computer", possibly noticing only a slight delay of a few seconds before the execution environments are activated.

Figure 13:
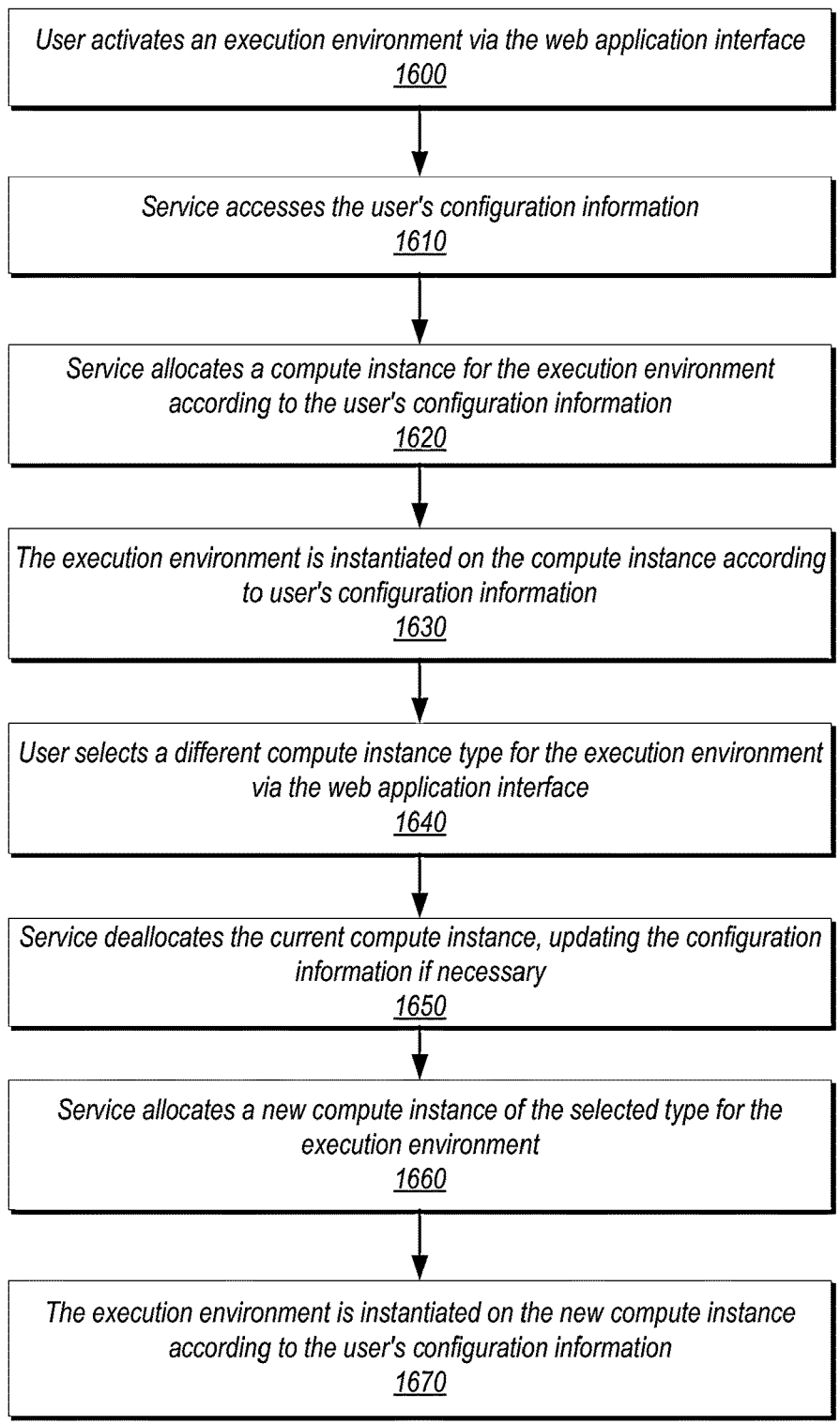
FIG. 13 is a flowchart of a method for allocating a compute instance of another type for a compute instance in the user's network environment, according to some embodiments.

FIG. 13 is a flowchart of a method for allocating a compute instance of another type for a compute instance in the user's network environment, according to some embodiments. As indicated at 1600, a user activates an execution environment via the web application interface. For example, the user may select a tab corresponding to the execution environment in a notebook document displayed on the web application interface as shown in FIG. 15B. In response to the access of the execution environment, the service may access the user's configuration information in their context as indicated at 1610, allocate a compute instance for the execution environment according to the user's configuration information as indicated at 1620, and instantiate the execution environment on the compute instance according to the user's configuration information as indicated at 1630. The execution environment may be instantiated from a previously stored version of the execution environment.

The computation service may provide two or more different types of compute instances with different sets of resources for users on the provider network. For example, the computation service may provide a base type with relatively limited resources including processors and memory, a second type that includes a lot of memory for memory-intensive applications, a third type that includes extended processing power including one or more GPUs for computation-intensive applications, and so on. As indicated at 640, the user may select a different compute instance type for the execution environment via the web application interface. For example, the user may work on an execution environment (e.g., modifying code in one or more cells of a notebook interface as illustrated in FIG. 15C), and when ready to execute the code in the execution environment, may select a different type of compute instance (e.g., a compute instance type with a lot of GPUs) to run the execution environment via the web application interface as illustrated in FIG. 15D.

As indicated at 1650, in response to the selection of the different instance type for the execution environment, the service may deallocate the current compute instance, updating the configuration information for the execution environment if necessary. As indicated at 1660, the service then allocates a new compute instance of the selected type on the provider network for the execution environment. As indicated at 1670, the execution environment is then instantiated on the new compute instance according to the user's configuration information. In some embodiments, to instantiate the execution environment on the compute instance, a host agent on the compute instance may obtain a previously generated version for the execution environment. The version includes an environment definition that includes a list of one or more layers of the execution environment including but not limited to a base layer (e.g., a container). The host agent then builds the execution environment including the one or more layers on the compute instance based on the environment definition, pulling components of the execution environment (e.g., the base container and one or more layers if present) from one or more stores of execution environment components on the provider network. The components may include but are not limited to components stored in the user's context on the network.

Figure 14:
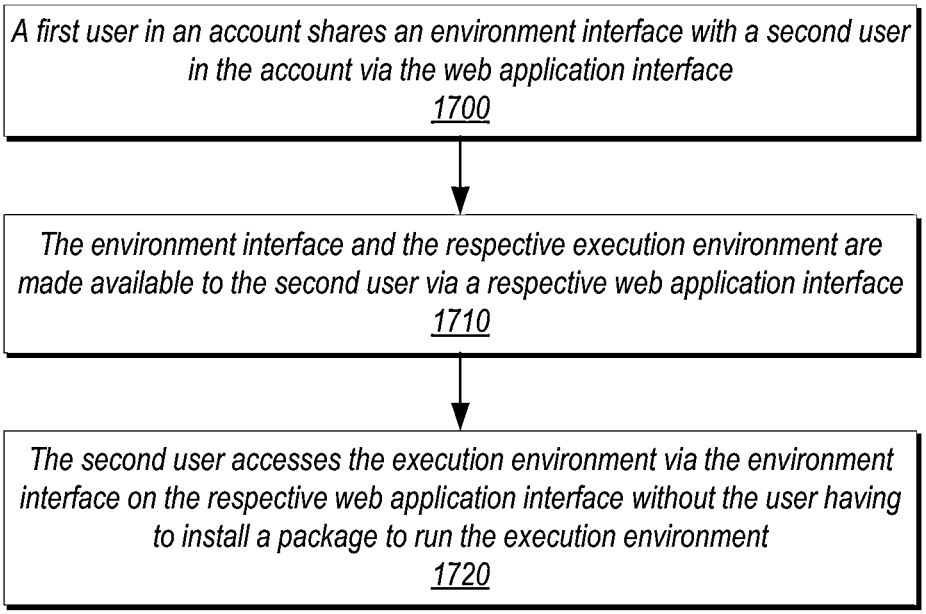
FIG. 14 is a flowchart of a method for sharing an environment interface, according to some embodiments.

FIG. 14 is a flowchart of a method for sharing an environment interface, according to some embodiments. As indicated at 1700, a first user in an account for a web-based application may share an environment interface (e.g., a notebook document, for example a Jupyter notebook document) with a second user in the account via their web application interface. As indicated at 1710, the environment interface and the respective execution environment are made available to the second user via a respective web application interface. As indicated at 1720, the second user may then access the execution environment via the environment interface on the respective web application interface without the user having to explicitly obtain a compute instance and install a package to run the execution environment.

FIGS. 15A through 15G show an example web application interface to a web-based application that may, for example, be used for performing the methods of FIGS. 10 through 14, according to some embodiments. A web application interface 1890 may, for example, be a web page that provides notebook documents as interfaces to execution environments (e.g., container-based execution environments). A notebook environment is a web-based interactive computational environment for creating notebook documents. A notebook document is, for example, a JSON document based on a versioned schema and contains an ordered list of input/output cells which can contain executable code (e.g., in Python, Julia, R, Haskell or other programming languages), text, mathematics, graphics, and rich media. An example notebook environment is the Jupyter Notebook environment. In a notebook environment such as Jupyter, a kernel is a program responsible for handling various types of requests (code execution, code completions, inspection, etc.) input via the cells, and for providing replies via the cells. An example kernel is an iPythyon kernel; however, kernels for various other programming languages may be provided. In some embodiments, the kernels are implemented in containers packaged in execution environments on compute instances, for example as illustrated in FIGS. 8A through 8H. The web application interface 1890 may also provide one or more controls 1896 for interactions with the computation service via an API to the service. Example interaction may include, but are not limited to, logging on to a web-based application, managing versions of an execution environment, and viewing and modifying settings for the user's account. The web application interface 1890 may also include one or more tabs 1899, for example tabs for selecting different notebook documents and their respective execution environments.

FIG. 15A shows an example login interface 1800 to a web-based application, according to some embodiments. A web application interface 1890 may include initial controls 1896 that may, for example, include an element that initiates a login attempt via login interface 1800. The interface 1800 may include alphanumeric interface elements via which a user may enter their name (or other identifier) and authentication (e.g. password). The interface 1800 may also include a "sign in" button that the user can select once their name and authentication have been entered to log in to the web-based application. When the user successfully logs on to the web-based application, the computation service configures a network environment (including but not limited to a compute instance include a web application instance and one or more execution environments) for the user according to the user's context as described above. Note that, upon an initial sign-in to their account, a default network environment may be configured; alternatively, the user may be asked to specify or select a configuration for their network environment.

FIG. 15B shows an example initial web application interface 1890 to a web-based application after the user has successfully logged into their account, according to some embodiments. An initial web application interface 1890 may provide one or more controls 1896 for interactions with the computation service via an API to the service. Example interaction may include, but are not limited to, logging out of the web-based application, managing versions of an execution environment, and viewing and modifying settings for the user's account. The web application interface 1890 may also include one or more tabs 1898, for example tabs for selecting different notebook documents and their respective execution environments as configured by the computation service from the user's context in response to the user's successful login to the web-based application.

FIG. 15C shows an example environment interface 1892A (e.g., a notebook document) for an execution environment instantiated in the user's network environment, according to some embodiments. The user may activate an execution environment via the web application interface 1890, for example by selecting a tab 1898A as illustrated in FIG. 15C. The notebook document corresponding to the selected execution environment may be displayed on web application interface 1890 as environment interface 1892A. The environment interface 1892A contains an ordered list of input/output cells 1894 which can contain executable code (e.g., in Python, Julia, R, Haskell or other programming languages), text, mathematics, graphics, rich media, or other content.

In some embodiments, the web application interface 1890 sends an indication of the activation to the web application instance in the user's network environment via the network pipe. If the execution environment is already instantiated on a compute instance in the user's network environment, then the user may begin working on the execution environment via the environment interface 1892A. Otherwise, if there is a compute instance available to host the execution environment, the web application instance may signal a host agent of the compute instance, and the host agent may build the indicated execution environment on the compute instance based on the user's configuration information. If there is not an available compute instance or if the execution environment requires a new compute instance, the web application instance may communicate with the computation service via an API to indicate that a compute instance is needed for the execution environment. The computation service may then allocate a new compute instance for the execution environment, and a host agent on the new compute instance may then build the computation environment based on the user's configuration information.

An example notebook environment is the Jupyter Notebook environment. In a notebook environment such as Jupyter, a kernel is a program responsible for handling various types of requests (code execution, code completions, inspection, etc.) input via the cell(s) 1894, and for providing replies via the cells 1894. An example kernel is an iPythyon kernel; however, kernels for various other programming languages may be provided. In embodiments, the kernels are implemented in containers packaged in execution environments on compute instances. In a notebook environment, notebook documents may be stored for a user in a persistent file volume on the provider network. The user may work on a respective notebook document via the environment interface 1892A, for example entering or modifying code in the cell(s) 1894. Amendments to the code are written to the notebook document in the persistent file volume. The user may execute one or more cells 1894 in the notebook document; when executed, the code may be sent to a kernel in a respective execution environment on a compute instance for execution; results of the execution may be written to the notebook document in the persistent file volume, and returned to the environment interface 1892 for display in a respective cell 1894.

FIG. 15D shows the user selecting a different compute instance type for an execution environment, according to some embodiments. Controls 1896 may include an interface element that, when selected, shows a list of different compute instance types that are available for a currently selected execution environment, and may include an indication of the current compute instance type for the execution environment. Upon selecting a different compute instance type for the execution environment, the computation service may switch compute instance types for the execution environment as illustrated in FIG. 13.

Figure 15E:
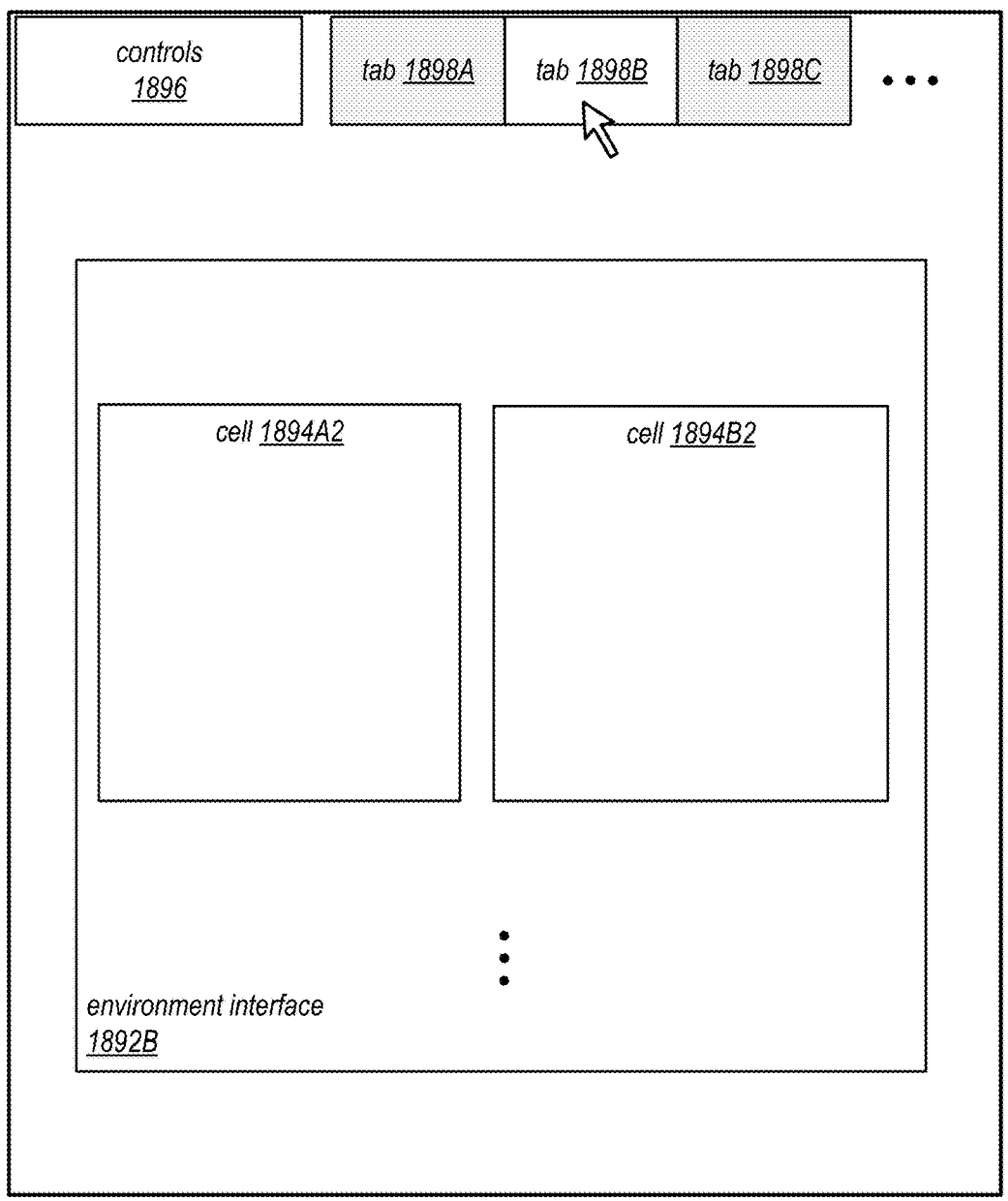

FIG. 15E shows the user selecting a different execution environment, according to some embodiments. If the user has more than one execution environment defined in their context, then the web application interface 1890 may include multiple tabs 1896, each corresponding to one of the computation environments. To switch execution environments, the user simply selects the corresponding tab 1898A. In this example, the user has selected the execution environment corresponding to tab 1898B. The notebook document corresponding to the selected execution environment may be displayed on web application interface 1890 as environment interface 1892B. The environment interface 1892B contains an ordered list of input/output cells 1894 which can contain executable code (e.g., in Python, Julia, R, Haskell or other programming languages), text, mathematics, graphics, rich media, or other content.

In some embodiments, the web application interface 1890 sends an indication of the activation to the web application instance in the user's network environment via the network pipe. If the execution environment is already instantiated on a compute instance in the user's network environment, then the user may begin working on the execution environment via the environment interface 1892B. Otherwise, if there is a compute instance available to host the execution environment, the web application instance may signal a host agent of the compute instance, and the host agent may build the indicated execution environment on the compute instance based on the user's configuration information. If there is not an available compute instance or if the execution environment requires a new compute instance, the web application instance may communicate with the computation service via an API to indicate that a compute instance is needed for the execution environment. The computation service may then allocate a new compute instance for the execution environment, and a host agent on the new compute instance may then build the computation environment based on the user's configuration information.

Figure 15F:
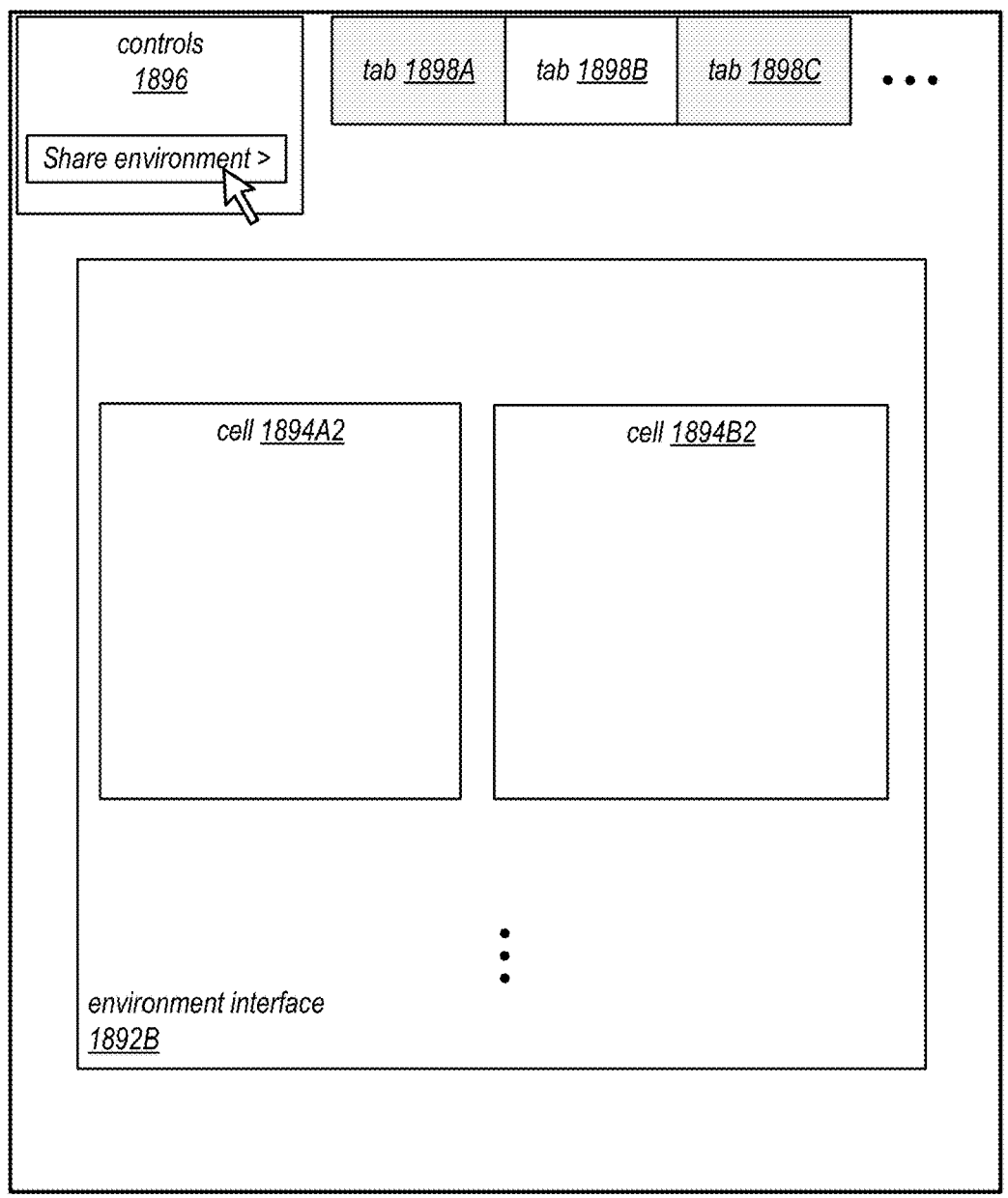
Figure 15G:
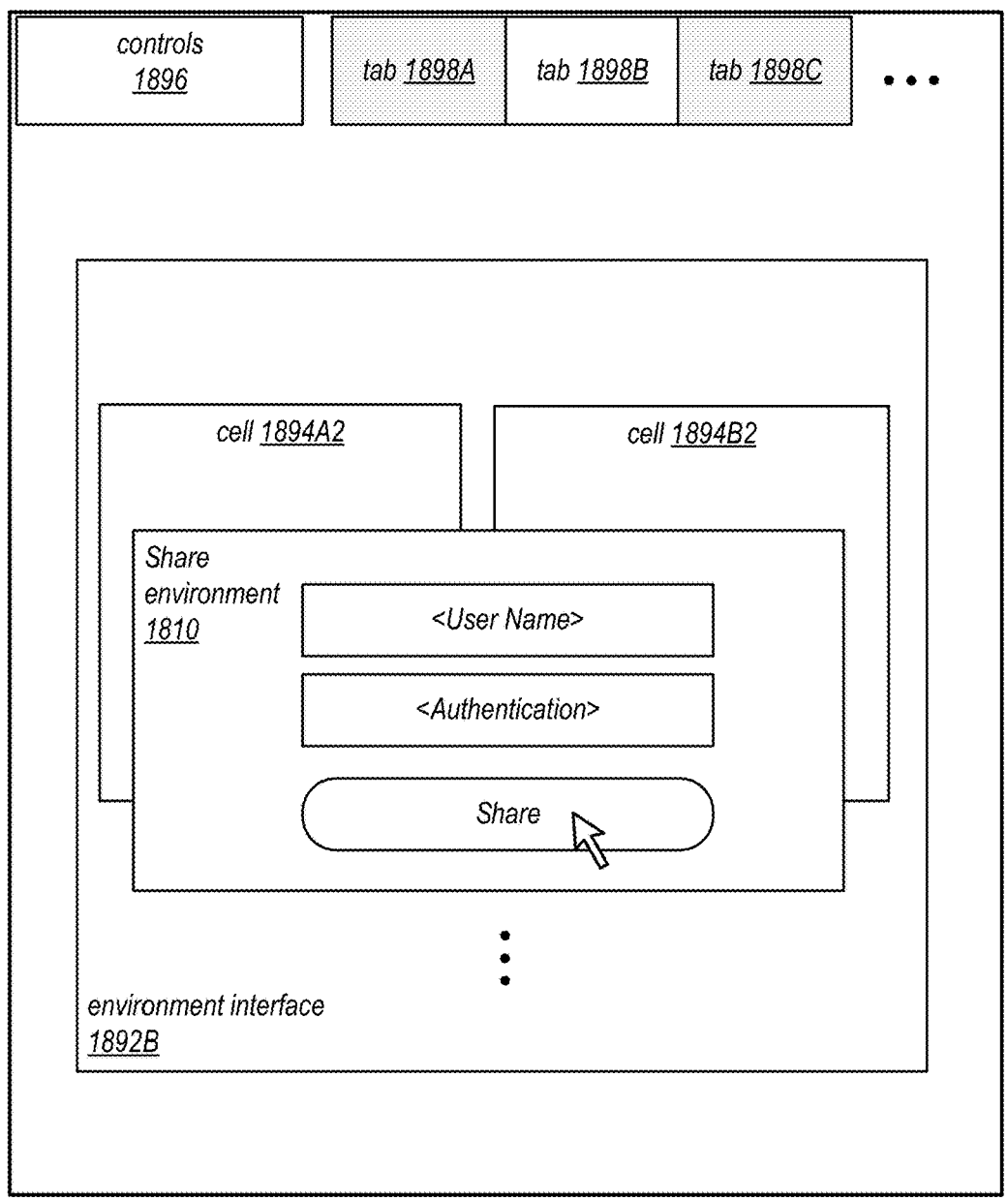

FIGS. 15F and 15G illustrate sharing a notebook document and the respective execution environment with another user, according to some embodiments. As shown in FIG. 15F, controls 1896 may include an interface element that, when selected, opens a "share environment" interface 1810, for example as illustrated in FIG. 15G, via which a user may share a selected notebook document (environment interface 1892B, in this example) and its respective execution environment with another user (or, in some embodiments, with a group of users). Interface 1810 may include, but is not limited to, an interface element via which the user can enter or select another user, an interface element to provide authentication for the share (e.g., the sharing user's password), and an element that, when selected, attempts to commit the share. Success or failure of the share attempt may be indicated to the sharing user via interface 1810. If successful, both the environment interface 1892B and the respective execution environment may be made available to the other user via their web application interface without the other user having to obtain a compute instance and install a package to build and run the execution environment.

EXAMPLE PROVIDER NETWORK ENVIRONMENT

This section describes example provider network environments in which embodiments of the methods and apparatus described in reference to FIGS. 1 through 15G may be implemented. However, these example provider network environments are not intended to be limiting.

Figure 16:
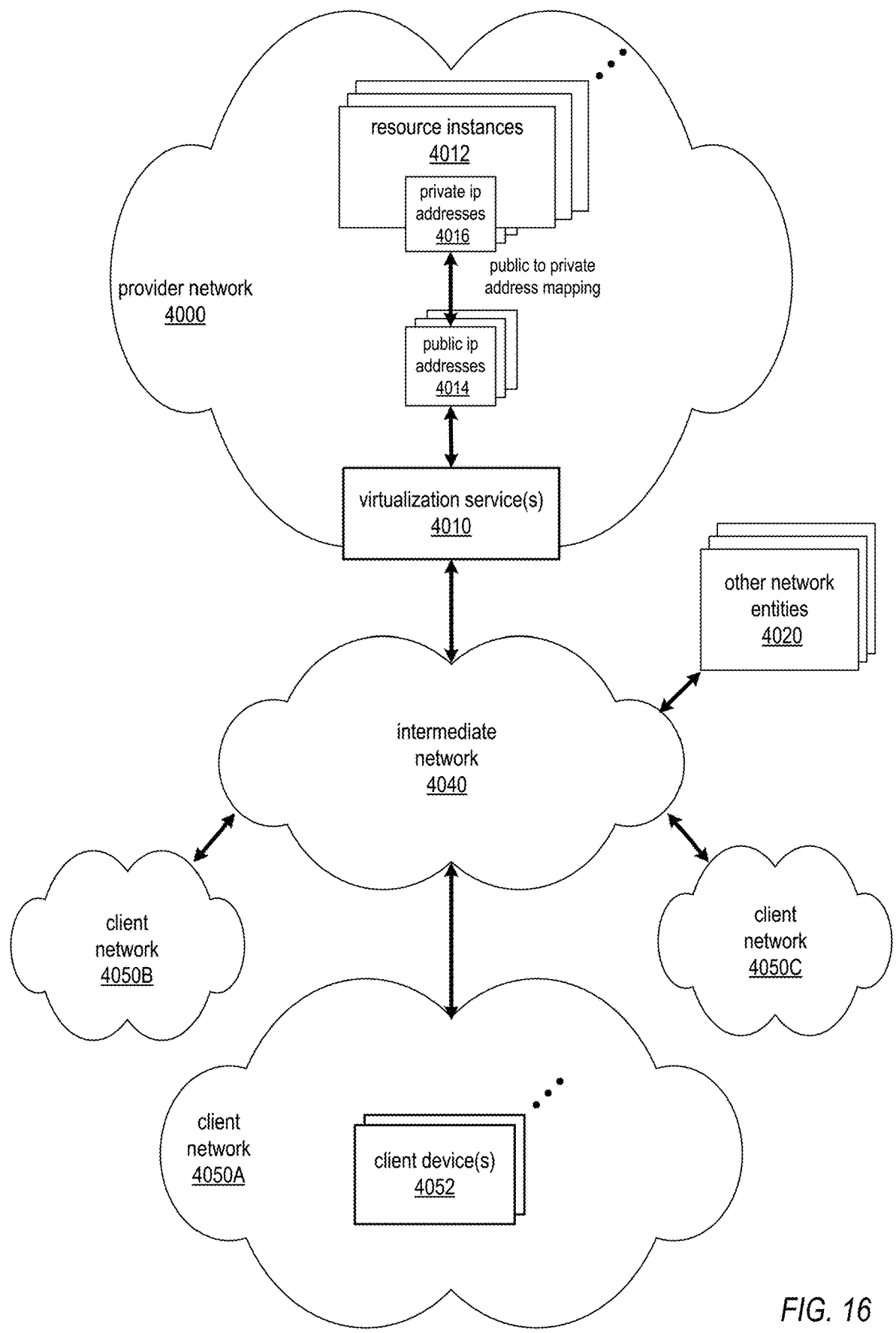
FIG. 16 illustrates an example provider network environment, according to some embodiments.

FIG. 16 illustrates an example provider network environment, according to some embodiments. A provider network 4000 may provide resource virtualization to clients via one or more virtualization services 4010 that allow clients to purchase, rent, or otherwise obtain instances 4012 of virtualized resources, including but not limited to computation and storage resources, implemented on devices within the provider network or networks in one or more data centers. Private IP addresses 4016 may be associated with the resource instances 4012; the private IP addresses are the internal network addresses of the resource instances 4012 on the provider network 4000. In some embodiments, the provider network 4000 may also provide public IP addresses 4014 and/or public IP address ranges (e.g., Internet Protocol version 4 (IPv4) or Internet Protocol version 6 (IPv6) addresses) that clients may obtain from the provider 4000.

Conventionally, the provider network 4000, via the virtualization services 4010, may allow a client of the service provider (e.g., a client that operates client network 4050A) to dynamically associate at least some public IP addresses 4014 assigned or allocated to the client with particular resource instances 4012 assigned to the client. The provider network 4000 may also allow the client to remap a public IP address 4014, previously mapped to one virtualized computing resource instance 4012 allocated to the client, to another virtualized computing resource instance 4012 that is also allocated to the client. Using the virtualized computing resource instances 4012 and public IP addresses 4014 provided by the service provider, a client of the service provider such as the operator of client network 4050A may, for example, implement client-specific applications and present the client's applications on an intermediate network 4040, such as the Internet. Other network entities 4020 on the intermediate network 4040 may then generate traffic to a destination public IP address 4014 published by the client network 4050A; the traffic is routed to the service provider data center, and at the data center is routed, via a network substrate, to the private IP address 4016 of the virtualized computing resource instance 4012 currently mapped to the destination public IP address 4014. Similarly, response traffic from the virtualized computing resource instance 4012 may be routed via the network substrate back onto the intermediate network 4040 to the source entity 4020.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include networking devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a private IP address of a resource instance is the default launch configuration for all resource instance types.

At least some public IP addresses may be allocated to or obtained by clients of the provider network 4000; a client may then assign their allocated public IP addresses to particular resource instances allocated to the client. These public IP addresses may be referred to as client public IP addresses, or simply client IP addresses. Instead of being assigned by the provider network 4000 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

Figure 17:
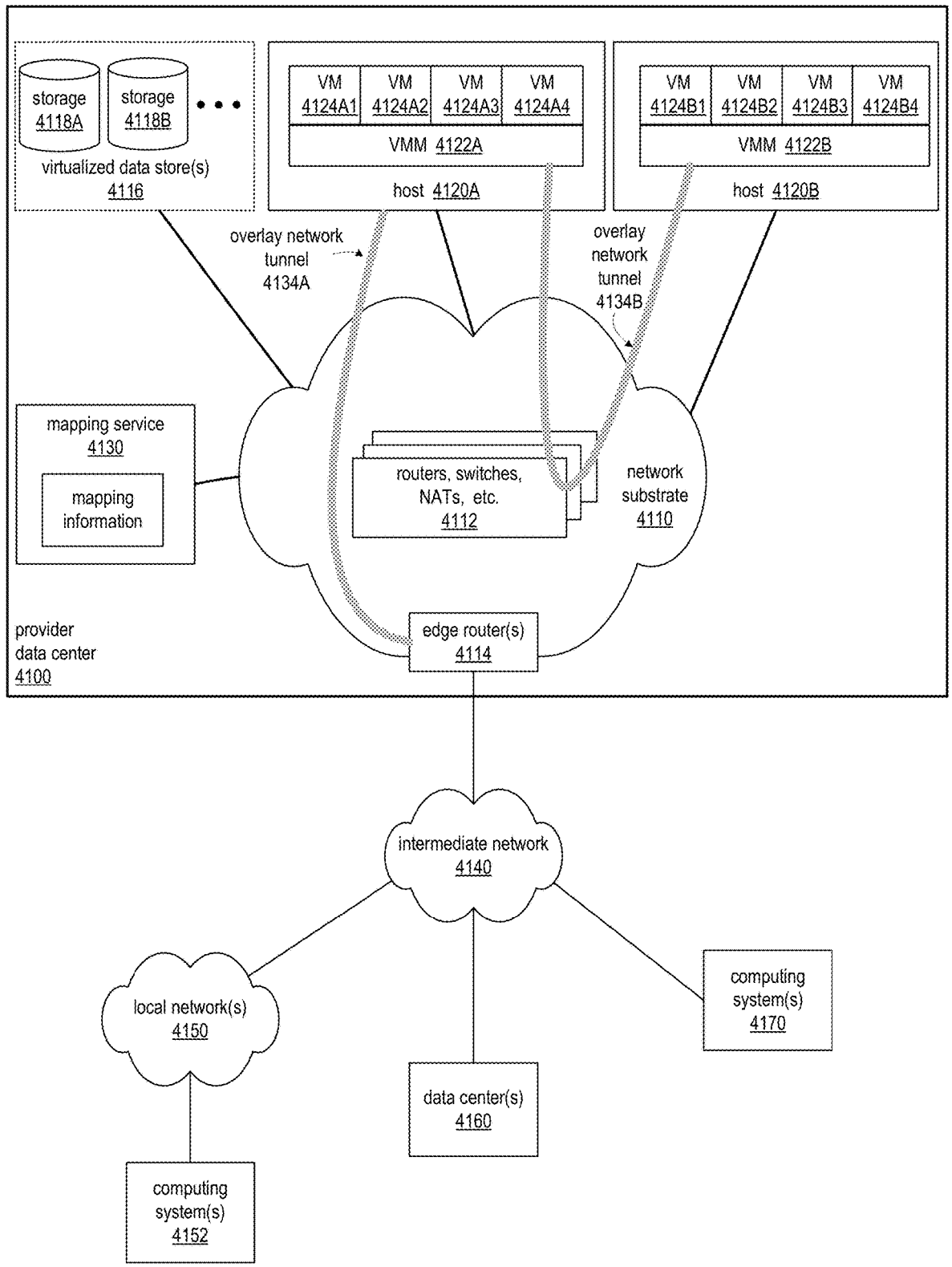
FIG. 17 illustrates an example data center that implements an overlay network on a network substrate using tunneling technology, according to some embodiments.

FIG. 17 illustrates an example data center that implements an overlay network on a network substrate using IP tunneling technology, according to some embodiments. A provider data center 4100 may include a network substrate that includes networking devices 4112 such as routers, switches, network address translators (NATs), and so on. Some embodiments may employ an Internet Protocol (IP) tunneling technology to provide an overlay network via which encapsulated packets may be passed through network substrate 4110 using tunnels. The IP tunneling technology may provide a mapping and encapsulating system for creating an overlay network on a network (e.g., a local network in data center 4100 of FIG. 17) and may provide a separate namespace for the overlay layer (the public IP addresses) and the network substrate 4110 layer (the private IP addresses). Packets in the overlay layer may be checked against a mapping directory (e.g., provided by mapping service 4130) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 4130) that knows where the IP overlay addresses are.

In some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 17, an example overlay network tunnel 4134A from a virtual machine (VM) 4124A on host 4120A to a device on the intermediate network 4150 and an example overlay network tunnel 4134B between a VM 4124B on host 4120B and a VM 4124C on host 4120C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 17, at least some networks in which embodiments may be implemented may include hardware virtualization technology that enables multiple operating systems to run concurrently on a host computer (e.g., hosts 4120A and 4120B of FIG. 17), i.e. as virtual machines (VMs) on the hosts 4120. The VMs 4124 may, for example, be executed in slots on the hosts 4120 that are rented or leased to clients of a network provider. A hypervisor, or virtual machine monitor (VMM) 4122, on a host 4120 presents the VMs 4124 on the host with a virtual platform and monitors the execution of the VMs 4124. Each VM 4124 may be provided with one or more private IP addresses; the VMM 4122 on a host 4120 may be aware of the private IP addresses of the VMs 4124 on the host. A mapping service 4130 may be aware of all network IP prefixes and the IP addresses of routers or other devices serving IP addresses on the local network. This includes the IP addresses of the VMNIs 4122 serving multiple VMs 4124. The mapping service 4130 may be centralized, for example on a server system, or alternatively may be distributed among two or more server systems or other devices on the network. A network may, for example, use the mapping service technology and IP tunneling technology to, for example, route data packets between VMs 4124 on different hosts 4120 within the data center 4100 network; note that an interior gateway protocol (IGP) may be used to exchange routing information within such a local network.

In addition, a network such as the provider data center 4100 network (which is sometimes referred to as an autonomous system (AS)) may use the mapping service technology, IP tunneling technology, and routing service technology to route packets from the VMs 4124 to Internet destinations, and from Internet sources to the VMs 4124. Note that an external gateway protocol (EGP) or border gateway protocol (BGP) is typically used for Internet routing between sources and destinations on the Internet. FIG. 17 shows an example provider data center 4100 implementing a network that provides resource virtualization technology and that provides full Internet access via edge router(s) 4114 that connect to Internet transit providers, according to some embodiments. The provider data center 4100 may, for example, provide clients the ability to implement virtual computing systems (VMs 4124) via a hardware virtualization service and the ability to implement virtualized data stores 4116 on storage resources 4118 via a storage virtualization service.

The data center 4100 network may implement IP tunneling technology, mapping service technology, and a routing service technology to route traffic to and from virtualized resources, for example to route packets from the VMs 4124 on hosts 4120 in data center 4100 to Internet destinations, and from Internet sources to the VMs 4124. Internet sources and destinations may, for example, include computing systems 4170 connected to the intermediate network 4140 and computing systems 4152 connected to local networks 4150 that connect to the intermediate network 4140 (e.g., via edge router(s) 4114 that connect the network 4150 to Internet transit providers). The provider data center 4100 network may also route packets between resources in data center 4100, for example from a VM 4124 on a host 4120 in data center 4100 to other VMs 4124 on the same host or on other hosts 4120 in data center 4100.

A service provider that provides data center 4100 may also provide additional data center(s) 4160 that include hardware virtualization technology similar to data center 4100 and that may also be connected to intermediate network 4140. Packets may be forwarded from data center 4100 to other data centers 4160, for example from a VM 4124 on a host 4120 in data center 4100 to another VM on another host in another, similar data center 4160, and vice versa.

While the above describes hardware virtualization technology that enables multiple operating systems to run concurrently on host computers as virtual machines (VMs) on the hosts, where the VMs may be instantiated on slots on hosts that are rented or leased to clients of the network provider, the hardware virtualization technology may also be used to provide other computing resources, for example storage resources 4118, as virtualized resources to clients of a network provider in a similar manner.

In some embodiments, instead of or in addition to providing hardware virtualization technology that enables multiple operating systems to run concurrently on host computers as virtual machines (VMs) on the hosts, container technology may be leveraged to provide containers to clients of the network provider. Container technology is a virtualization technology that allows applications to be developed as containers that can be deployed to and executed in container-based virtualization environments provided by container platforms on host machines, for example on one or more hosts 4120 in a provider data center 4100. A container is a stand-alone executable package that executes in a container-based virtualization environment on a host machine and that includes resources needed to execute an application in the container-based virtualization environment: e.g., code, runtime, system tools, system libraries, and settings. A container platform virtualizes an operating system (OS) in order for multiple containers to run on a single OS instance. A primary difference between containers and VMs is that containers provide a way to virtualize an OS in order for multiple workloads to run on a single OS instance, whereas with VMs, the hardware is virtualized to run multiple OS instances.

Figure 18:
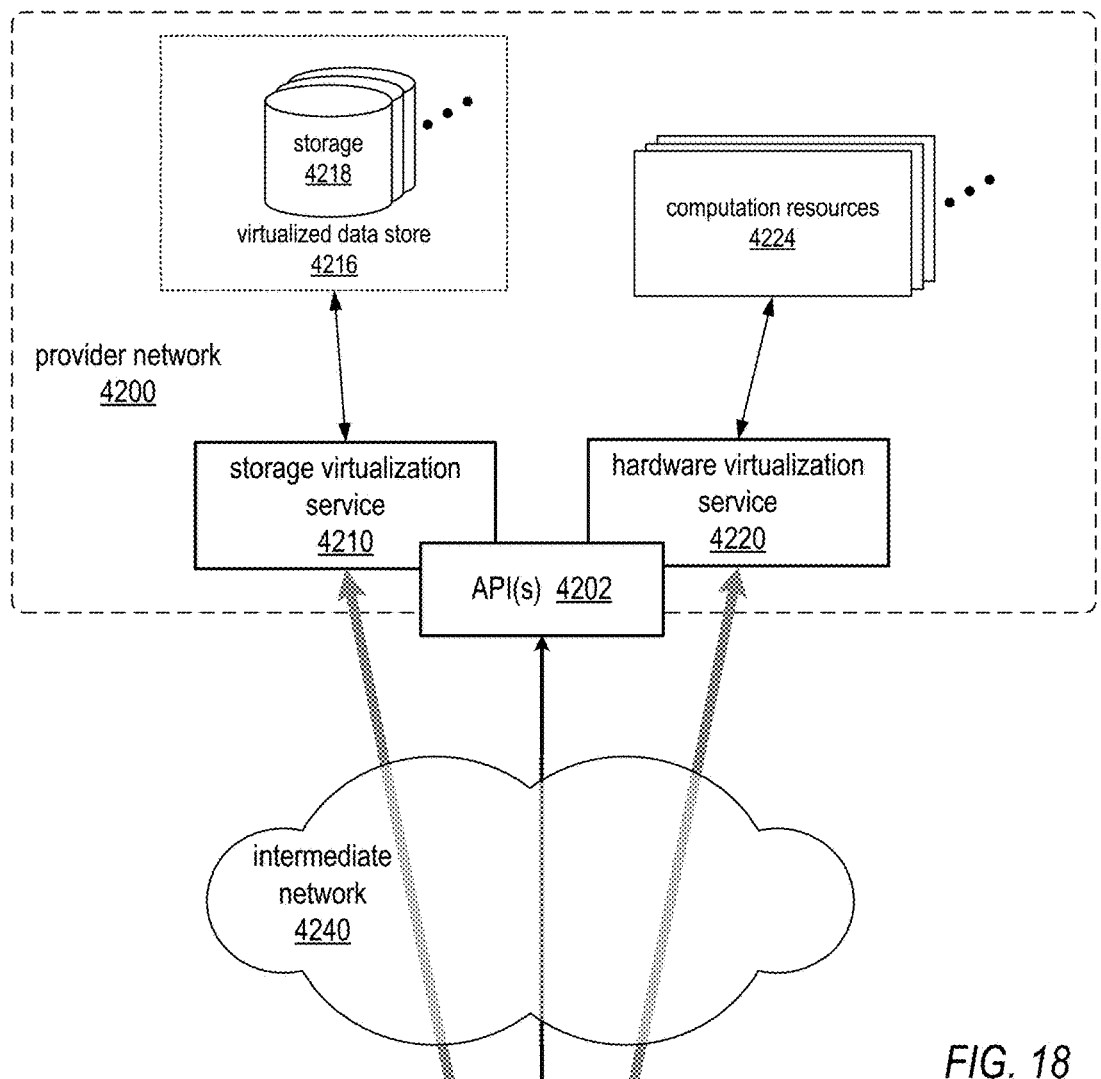
FIG. 18 is a block diagram of an example provider network that provides a storage virtualization service and a hardware virtualization service to clients, according to some embodiments.
Figure 18:
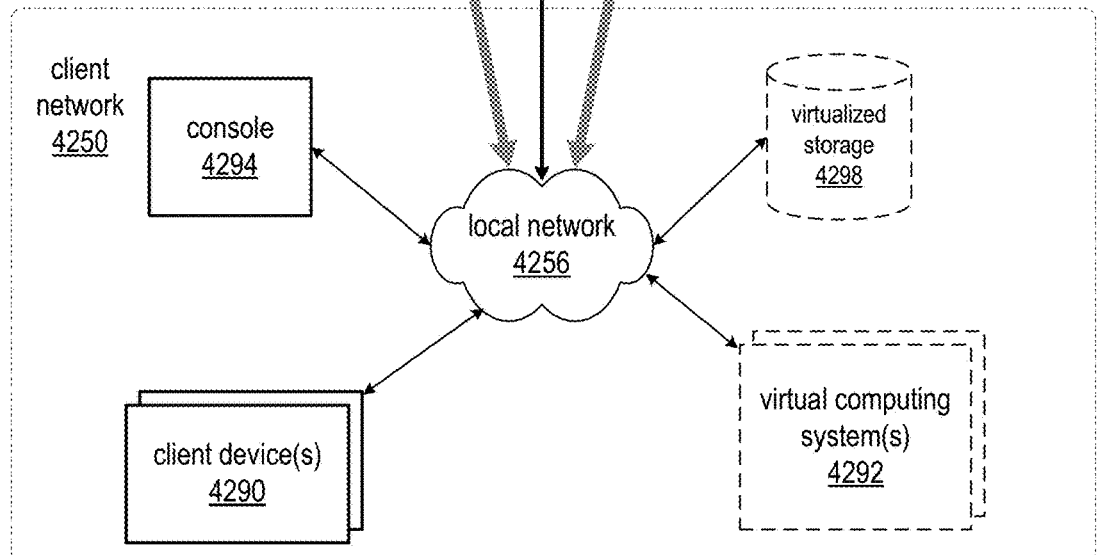

FIG. 18 is a block diagram of an example provider network that provides a storage virtualization service and a hardware virtualization service to clients, according to some embodiments. Hardware virtualization service 4220 provides multiple computation resources 4224 (e.g., VMs) to clients. The computation resources 4224 may, for example, be rented or leased to clients of the provider network 4200 (e.g., to a client that implements client network 4250). Each computation resource 4224 may be provided with one or more private IP addresses. Provider network 4200 may be configured to route packets from the private IP addresses of the computation resources 4224 to public Internet destinations, and from public Internet sources to the computation resources 4224.

Provider network 4200 may provide a client network 4250, for example coupled to intermediate network 4240 via local network 4256, the ability to implement virtual computing systems 4292 via hardware virtualization service 4220 coupled to intermediate network 4240 and to provider network 4200. In some embodiments, hardware virtualization service 4220 may provide one or more APIs 4202, for example a web services interface, via which a client network 4250 may access functionality provided by the hardware virtualization service 4220, for example via a console 4294. In some embodiments, at the provider network 4200, each virtual computing system 4292 at client network 4250 may correspond to a computation resource 4224 that is leased, rented, or otherwise provided to client network 4250.

From an instance of a virtual computing system 4292 and/or another client device 4290 or console 4294, the client may access the functionality of storage virtualization service 4210, for example via one or more APIs 4202, to access data from and store data to a virtual data store 4216 provided by the provider network 4200. In some embodiments, a virtualized data store gateway (not shown) may be provided at the client network 4250 that may locally cache at least some data, for example frequently accessed or critical data, and that may communicate with virtualized data store service 4210 via one or more communications channels to upload new or modified data from a local cache so that the primary store of data (virtualized data store 4216) is maintained. In some embodiments, a user, via a virtual computing system 4292 and/or on another client device 4290, may mount and access virtual data store 4216 volumes, which appear to the user as local virtualized storage 4298.

While not shown in FIG. 18, the virtualization service(s) may also be accessed from resource instances within the provider network 4200 via API(s) 4202. For example, a client, appliance service provider, or other entity may access a virtualization service from within a respective virtual network on the provider network 4200 via an API 4202 to request allocation of one or more resource instances within the virtual network or within another virtual network.

Figure 19:
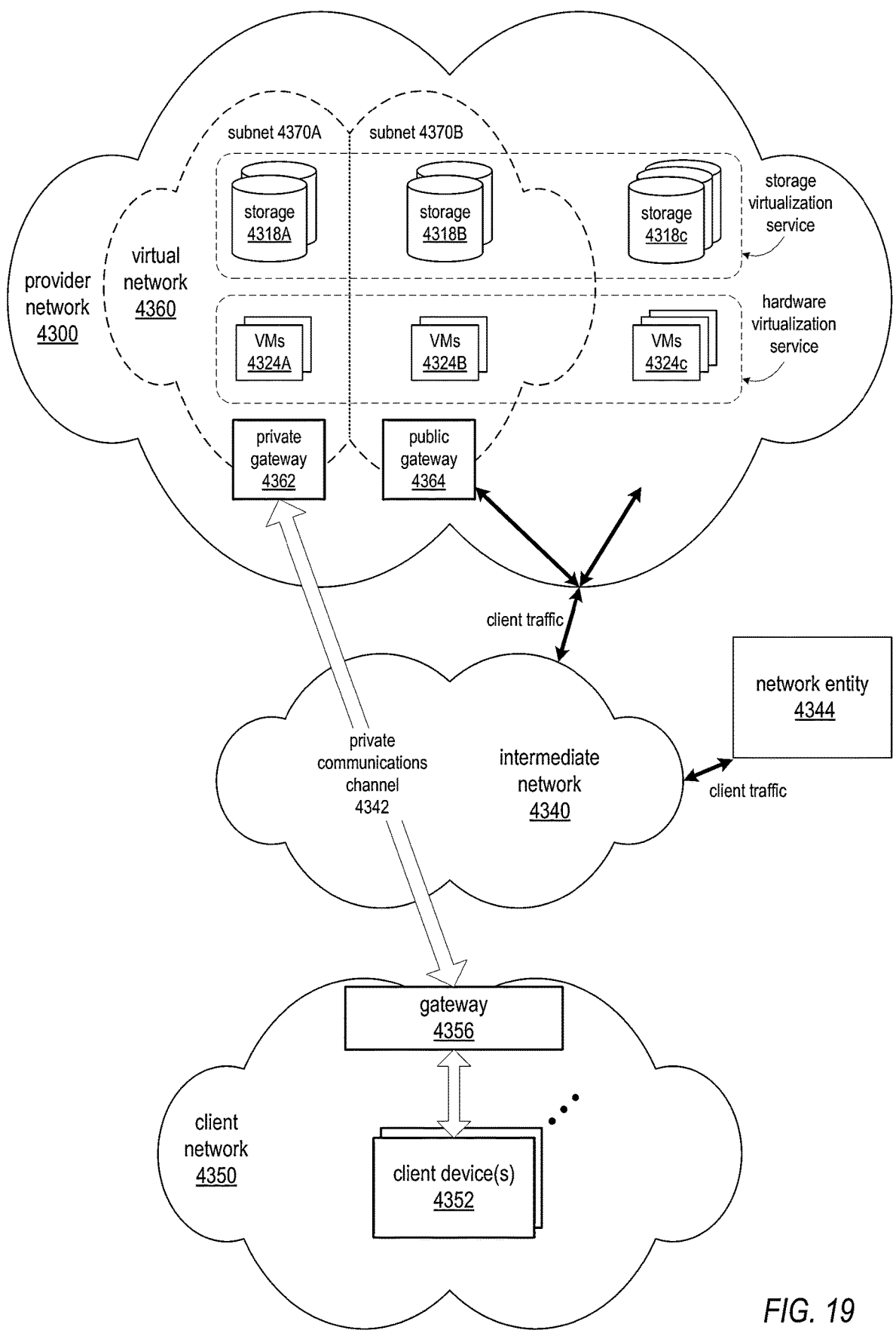
FIG. 19 illustrates an example provider network that provides virtual networks to at least some clients, according to some embodiments.

FIG. 19 illustrates an example provider network that provides virtual networks on the provider network to at least some clients, according to some embodiments. A client's virtual network 4360 on a provider network 4300, for example, enables a client to connect their existing infrastructure (e.g., devices 4352) on client network 4350 to a set of logically isolated resource instances (e.g., VMs 4324A and 4324B and storage 4318A and 4318B), and to extend management capabilities such as security services, firewalls, and intrusion detection systems to include their resource instances.

A client's virtual network 4360 may be connected to a client network 4350 via a private communications channel 4342. A private communications channel 4342 may, for example, be a tunnel implemented according to a network tunneling technology or some other technology over an intermediate network 4340. The intermediate network may, for example, be a shared network or a public network such as the Internet. Alternatively, a private communications channel 4342 may be implemented over a direct, dedicated connection between virtual network 4360 and client network 4350.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a client network.

To establish a virtual network 4360 for a client on provider network 4300, one or more resource instances (e.g., VMs 4324A and 4324B and storage 4318A and 4318B) may be allocated to the virtual network 4360. Note that other resource instances (e.g., storage 4318C and VMs 4324C) may remain available on the provider network 4300 for other client usage. A range of public IP addresses may also be allocated to the virtual network 4360. In addition, one or more networking devices (routers, switches, etc.) of the provider network 4300 may be allocated to the virtual network 4360. A private communications channel 4342 may be established between a private gateway 4362 at virtual network 4360 and a gateway 4356 at client network 4350.

In some embodiments, in addition to, or instead of, a private gateway 4362, virtual network 4360 may include a public gateway 4364 that enables resources within virtual network 4360 to communicate directly with entities (e.g., network entity 4344) via intermediate network 4340, and vice versa, instead of or in addition to via private communications channel 4342.

Virtual network 4360 may be, but is not necessarily, subdivided into two or more subnetworks, or subnets, 4370. For example, in implementations that include both a private gateway 4362 and a public gateway 4364, a virtual network 4360 may be subdivided into a subnet 4370A that includes resources (VMs 4324A and storage 4318A, in this example) reachable through private gateway 4362, and a subnet 4370B that includes resources (VMs 4324B and storage 4318B, in this example) reachable through public gateway 4364.

The client may assign particular client public IP addresses to particular resource instances in virtual network 4360. A network entity 4344 on intermediate network 4340 may then send traffic to a public IP address published by the client; the traffic is routed, by the provider network 4300, to the associated resource instance. Return traffic from the resource instance is routed, by the provider network 4300, back to the network entity 4344 over intermediate network 4340. Note that routing traffic between a resource instance and a network entity 4344 may require network address translation to translate between the public IP address and the private IP address of the resource instance.

Some embodiments may allow a client to remap public IP addresses in a client's virtual network 4360 as illustrated in FIG. 19 to devices on the client's external network 4350. When a packet is received (e.g., from network entity 4344), the network 4300 may determine that the destination IP address indicated by the packet has been remapped to an endpoint on external network 4350 and handle routing of the packet to the respective endpoint, either via private communications channel 4342 or via the intermediate network 4340. Response traffic may be routed from the endpoint to the network entity 4344 through the provider network 4300, or alternatively may be directly routed to the network entity 4344 by the client network 4350. From the perspective of the network entity 4344, it appears as if the network entity 4344 is communicating with the public IP address of the client on the provider network 4300. However, the network entity 4344 has actually communicated with the endpoint on client network 4350.

While FIG. 19 shows network entity 4344 on intermediate network 4340 and external to provider network 4300, a network entity may be an entity on provider network 4300. For example, one of the resource instances provided by provider network 4300 may be a network entity that sends traffic to a public IP address published by the client.

Illustrative System

Figure 20:
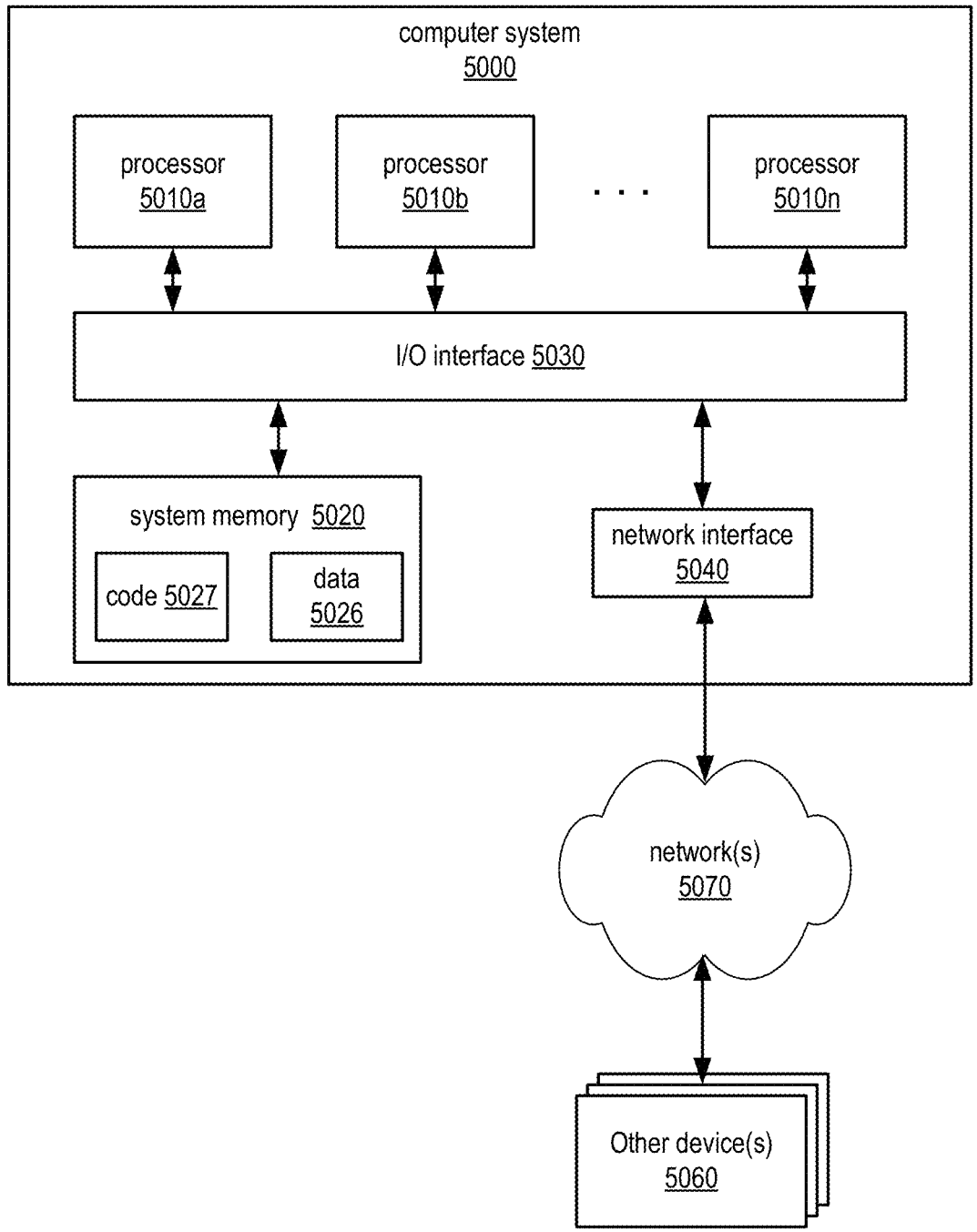
FIG. 20 is a block diagram illustrating an example computer system that may be used in some embodiments.

In some embodiments, a system that implements a portion or all of the methods and apparatus for providing persistent execution environments and serverless computation environments with persistent storage as described herein may include a general-purpose computer system that includes or is configured to access one or more computer-accessible media, such as computer system 5000 illustrated in FIG. 20. In the illustrated embodiment, computer system 5000 includes one or more processors 5010 coupled to a system memory 5020 via an input/output (I/O) interface 5030. Computer system 5000 further includes a network interface 5040 coupled to I/O interface 5030. While FIG. 20 shows computer system 5000 as a single computing device, in various embodiments a computer system 5000 may include one computing device or any number of computing devices configured to work together as a single computer system 5000.

In various embodiments, computer system 5000 may be a uniprocessor system including one processor 5010, or a multiprocessor system including several processors 5010 (e.g., two, four, eight, or another suitable number). Processors 5010 may be any suitable processors capable of executing instructions. For example, in various embodiments, processors 5010 may be general-purpose or embedded processors implementing any of a variety of instruction set architectures (ISAs), such as the x86, PowerPC, SPARC, or MIPS ISAs, or any other suitable ISA. In multiprocessor systems, each of processors 5010 may commonly, but not necessarily, implement the same ISA.

System memory 5020 may be configured to store instructions and data accessible by processor(s) 5010. In various embodiments, system memory 5020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for providing client-defined rules for clients' resources in provider network environments, are shown stored within system memory 5020 as code 5025 and data 5026.

In one embodiment, I/O interface 5030 may be configured to coordinate I/O traffic between processor 5010, system memory 5020, and any peripheral devices in the device, including network interface 5040 or other peripheral interfaces. In some embodiments, I/O interface 5030 may perform any necessary protocol, timing or other data transformations to convert data signals from one component (e.g., system memory 5020) into a format suitable for use by another component (e.g., processor 5010). In some embodiments, I/O interface 5030 may include support for devices attached through various types of peripheral buses, such as a variant of the Peripheral Component Interconnect (PCI) bus standard or the Universal Serial Bus (USB) standard, for example. In some embodiments, the function of I/O interface 5030 may be split into two or more separate components, such as a north bridge and a south bridge, for example. Also, in some embodiments some or all of the functionality of I/O interface 5030, such as an interface to system memory 5020, may be incorporated directly into processor 5010.

Network interface 5040 may be configured to allow data to be exchanged between computer system 5000 and other devices 5060 attached to a network or networks 5050, such as other computer systems or devices as illustrated in FIGS. 1 through 19, for example. In various embodiments, network interface 5040 may support communication via any suitable wired or wireless general data networks, such as types of Ethernet network, for example. Additionally, network interface 5040 may support communication via telecommunications/telephony networks such as analog voice networks or digital fiber communications networks, via storage area networks such as Fibre Channel SANs, or via any other suitable type of network and/or protocol.

In some embodiments, system memory 5020 may be one embodiment of a computer-accessible medium configured to store program instructions and data as described above for FIGS. 1 through 15G for providing persistent computation environments and serverless computation environments with persistent storage. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computer system 5000 via I/O interface 5030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 5000 as system memory 5020 or another type of memory. Further, a computer-readable medium may include transmission media or signals such as electrical, electromagnetic, or digital signals, conveyed via a communication medium such as a network and/or a wireless link, such as may be implemented via network interface 5040.

CONCLUSION

Various embodiments may further include receiving, sending or storing instructions and/or data implemented in accordance with the foregoing description upon one or more computer-readable media. Generally speaking, a computer-readable medium may include non-transitory storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more processors and corresponding memory, on a network, configured to implement a computation service configured to:
      receive an indication of an execution environment from a user interface via an application programming interface (API) to the computation service; and
      in response to the indication:
         allocate a compute instance for the environment on a host device, comprising one or more other processors and corresponding memory, on the network; and instantiate a host agent and a web server on the compute instance, wherein the one or more other processors and corresponding memory is configured to, via the host agent:

instantiate the execution environment on the compute instance, wherein the instantiated execution environment is for an environment interface displayed by the user interface, wherein the execution environment comprises a container as a base layer and one or more additional layers, wherein the environment interface is configured to interact with the execution environment through the web server on the compute instance to execute code within the container; and instantiate a monitoring agent, distinct from the host agent, on the compute instance, wherein the one or more other processors and corresponding memory is configured to, via the monitoring agent monitor the execution environment on the compute instance to detect one or more changes in the execution environment caused by the environment interface interactions with the execution environment;

wherein the one or more processors and corresponding memory are configured to, based on an indication of the one or more changes in the execution environment;

generate a new environment version that includes the one or more changes; and store the new environment version that includes the one or more detected changes in the execution environment caused by the interactions with the execution environment; and wherein the one or more processors and corresponding memory are configured to instantiate a new environment from the stored new environment version.

2. The system as recited in claim 1, wherein, to instantiate the environment on the compute instance, the host agent is configured to build the execution environment on the compute instance according to a previously generated environment version for the environment.

3. The system as recited in claim 2, wherein the indication of the environment is an environment identifier that uniquely identifies the respective environment, and wherein an environment version for the environment includes an environment definition that includes a list of the layers of the environment, wherein the environment definition is configured to be used to build an execution environment for the environment version on compute instances.

4. The system as recited in claim 1,
wherein, to cause a new environment version that includes the one or more changes to be generated, the monitoring agent is configured to:
generate a snapshot of the one or more changes in the execution environment; and
provide the snapshot to the API of the computation service;
wherein the computation service is configured to:
perform said generate the new environment version including the one or more changes in the execution environment; and
perform said store the new environment version.

5. The system as recited in claim 1, wherein the network provides two or more different types of compute instances, and wherein the computation service is further configured to:

receive input from the user interface requesting another type of compute instance for the environment via the API to the computation service; and in response to the request, deallocate the previously allocated compute instance and allocate a new compute instance of the other type for the environment on a host device on the network;

wherein a host agent on the new compute instance is configured to instantiate an execution environment for the environment on the new compute instance according to a previously generated environment version.

6. A method, comprising:
performing, by a computation service implemented by one or more devices on a network:
responsive to receipt of an indication of an execution environment from a user interface via an application programming interface (API) to the computation service:
allocating a compute instance on a host device on the network;
instantiating a host agent and a web server on the compute instance;
instantiating the execution environment on the compute instance, wherein the instantiated execution environment is for an environment interface displayed by a user interface, wherein the execution environment comprises a container as a base layer and one or more additional layers, and wherein the environment interface is configured to interact with the execution environment through the web server on the compute instance to execute code within the container; and
instantiating a monitoring agent, distinct from the host agent, on the compute instance;
monitoring, by the monitoring agent, interactions with the execution environment received over the network from an interface to the computation service;
detecting, by the monitoring agent, one or more changes in the execution environment caused by the interactions with the execution environment over the network from the interface to the computation service;
generating, in response to an indication of the one or more changes in the execution environment, a new environment version for the execution environment that includes the one or more detected changes in the execution environment caused by the interactions with the execution environment;
storing the new environment version that includes the one or more detected changes in the execution environment caused by the interactions with the execution environment; and
instantiating a new environment from the stored new environment version.

7. The method as recited in claim 6, wherein said allocating and said instantiating the execution environment are performed in response to input from the interface to the computation service received over the network.

8. The method as recited in claim 7, wherein the input includes an environment identifier that uniquely identifies the respective execution environment.

9. The method as recited in claim 6, wherein instantiating the execution environment on the compute instance comprises instantiating the execution environment according to a previously generated environment version for the execution environment.

10. The method as recited in claim 9, wherein the previously generated environment version includes an environment definition that includes a list of one or more layers of the execution environment.

11. The method as recited in claim 10, wherein the one or more layers include a base layer and one or more additional layers on top of the base layer, wherein building the execution environment on the compute instance comprises obtaining the listed layers in order from one or more repositories and instantiating the layers on the compute instance.

12. The method as recited in claim 11, further comprising making the execution environment accessible to the interface to the computation service after instantiating the base layer of the execution environment and prior to installing a last layer of the execution environment.

13. The method as recited in claim 6, wherein generating a new environment version that includes the one or more changes comprises:
- generating, on the compute instance, a snapshot of the one or more changes in the execution environment;
- providing, by the compute instance, the snapshot to an API of the computation service; and
- generating, by the computation service, the new environment version including the one or more changes in the execution environment.

14. The method as recited in claim 6, wherein the network provides two or more different types of compute instances for compute instances, the method further comprising:
- receiving input from the interface to the computation service requesting another type of compute instance for the environment via an API to the computation service;
- in response to the request, deallocating the previously allocated compute instance and allocating a new compute instance of the other type for the execution environment on a host device on the network; and
- building an execution environment on the new compute instance according to a previously generated environment version for the execution environment.

15. One or more non-transitory computer-readable storage media storing program instructions that when executed on or across one or more processors cause the one or more processors to:
- responsive to receipt of an indication of an execution environment from a user interface via an application programming interface (API) to a computation service:
  - allocate a compute instance on a host device on a network to an execution environment for a computation service; and
  - instantiate a host agent and a web server on the compute instance;
  - build the execution environment on the compute instance according to an environment version for the execution environment stored on the network, wherein the built execution environment is for an environment interface displayed by a user interface, wherein the execution environment comprises a container as a base layer and one or more additional layers, and wherein the environment interface is configured to interact with the execution environment through the web server on the compute instance to execute code within the container;
- instantiate a monitoring agent, distinct from the host agent, on the compute instance;
- monitor, by the monitoring agent, interactions with the execution environment received over the network from an interface to the computation service; and
- detect, by the monitoring agent, one or more changes to the execution environment caused by the interactions with the execution environment over the network from the interface to the computation service;
- generate, in response to said detect the one or more changes in the execution environment, a new environment version for the execution environment that includes the one or more detected changes in the execution environment caused by the interactions with the execution environment;
- store the new environment version that includes the one or more detected changes in the execution environment caused by the interactions with the execution environment; and
- instantiate a new environment from the stored new environment version.

16. The one or more non-transitory computer-readable storage media as recited in claim 15, wherein the environment version includes an environment definition that includes a list of the one or more layers of the execution environment.

17. The one or more non-transitory computer-readable storage media as recited in claim 15, wherein the network provides two or more different types of compute instances, the one or more non-transitory computer-readable storage media further storing program instructions that when executed on or across the one or more processors further cause the one or more processors to:
- receive input from the interface to the computation service requesting another type of compute instance for the environment;
- in response to the request, deallocate the previously allocated compute instance and allocate a new compute instance of the other type for the environment on a host device on the network; and
- build an execution environment on the new compute instance according to a previously stored environment version for the execution environment.

* * * * *